US012626040B1

(12) United States Patent
Manna et al.

(10) Patent No.: US 12,626,040 B1
(45) Date of Patent: May 12, 2026

(54) METHODS AND SYSTEMS FOR FLOATING NODE DETECTION

(71) Applicant: Dialog Semiconductor (UK) Limited, London (GB)

(72) Inventors: Indrajit Manna, Cheltenham (GB); Russell Giles, Southrop (GB); Peter Bell, Wokingham (GB)

(73) Assignee: Renesas Design (UK) Limited, London (GB)

( * ) Notice: Subject to any disclaimer, the term of this patent is extended or adjusted under 35 U.S.C. 154(b) by 1044 days.

(21) Appl. No.: 17/019,851

(22) Filed: Sep. 14, 2020

(51) Int. Cl.
*G06F 30/3308* (2020.01)
*G06F 30/333* (2020.01)
*G06F 119/06* (2020.01)
*G06N 3/08* (2023.01)

(52) U.S. Cl.
CPC ........ *G06F 30/3308* (2020.01); *G06F 30/333* (2020.01); *G06N 3/08* (2013.01); *G06F 2119/06* (2020.01)

(58) Field of Classification Search
CPC .............. G06F 30/3308; G06F 30/333; G06F 2119/06; G06N 3/08
See application file for complete search history.

(56) References Cited

U.S. PATENT DOCUMENTS

| | | | | | |
|---|---|---|---|---|---|
| 6,239,607 | B1 * | 5/2001 | Maxwell | ........... | G01R 31/2846 714/733 |
| 6,308,300 | B1 | 10/2001 | Bushnell | | |
| 9,614,540 | B1 | 4/2017 | Kull | | |
| 10,970,441 | B1 | 4/2021 | Zhang et al. | | |
| 2009/0112564 | A1 | 4/2009 | Schmieder | | |
| 2009/0254874 | A1 * | 10/2009 | Bose | ........... | G06F 30/39 716/113 |
| 2010/0332206 | A1 | 12/2010 | Leu | | |
| 2012/0074918 | A1 | 3/2012 | Shimomura | | |
| 2012/0188109 | A1 | 7/2012 | Sanduleanu | | |
| 2013/0020646 | A1 | 1/2013 | Deval et al. | | |
| 2016/0285470 | A1 | 9/2016 | Leuschner et al. | | |
| 2019/0013819 | A1 | 1/2019 | D'Alessio et al. | | |
| 2019/0252998 | A1 | 8/2019 | Sakamoto et al. | | |
| 2021/0021448 | A1 | 1/2021 | Beukema | | |

OTHER PUBLICATIONS

Qian, H., Deng, Y., Wang, B., & Mu, S. (2012). Towards accelerating irregular EDA applications with GPUs. Integration, 45(1), 46-60. (Year: 2012).*
Shook, B., Bhansali, P., Kashyap, C., Amin, C., & Joshi, S. (Jul. 2020). MLParest: Machine learning based parasitic estimation for custom circuit design. In 2020 57th ACM/IEEE Design Automation Conference (DAC) (pp. 1-6). IEEE. (Year: 2020).*

(Continued)

*Primary Examiner* — Bijan Mapar
(74) *Attorney, Agent, or Firm* — Saile Ackerman LLC; Stephen B Ackerman

(57) ABSTRACT

Methods and systems for detecting problematic floating nodes in an electronic circuit or electronic circuit design are presented. Floating node detection methods and systems use graph crawling techniques in combination with machine learning to perform an exhaustive search for floating nodes without requiring the use of expensive commercial simulation tools.

27 Claims, 17 Drawing Sheets

Non Problematic

902

'x'

900

Candidate Problematic Floating Node

902

'x'

Source and Drain At Different Potential

(56)　　　References Cited

OTHER PUBLICATIONS

US Notice of Allowance, U.S. Appl. No. 17/072,293, Applicant: Manna et al., Mail date: Oct. 3, 2022, 12 pages.

Spectre Tech Tips: Spectre High Impedance Node Check Overview, Amaninder, Jul. 29, 2021, 5 pages, found: https://community.cadence.com/cadence_blogs_8/b/cic/posts/spectre-tech-tips-spectre-high-impedance-node-check-overview, Copyright Cadence Design Systems, Inc.

Co-pending US Patent, "A Method for Identifying a Leakage Current Path in a Circuit," U.S. Appl. No. 17/719,828, Filed: Apr. 13, 2022, Peter Bell et al., 24 pages.

US Notice of Allowance, U.S. Appl. No. 17/072,293, Applicant: Manna et al., Mail date: Jun. 23, 2022, 12 pages.

US Office Action, U.S. Appl. No. 17/072,293, Applicant: Manna et al., Mail date: Jan. 28, 2022, 16 pages.

US Office Action, U.S. Appl. No. 17/072,293, Applicant: Manna et al., Mail date: Jun. 23, 2021, 13 pages.

"Graph (abstract data type)," Wikipedia, last edited on Mar. 2, 2022, 2 pages. Retrieved from: https://en.wikipedia.org/w/index.php?title=Graph_(abstract_data_type)&oldid=1074929950.

US Office Action, U.S. Appl. No. 17/719,828, Applicant: Manna et al., Mail date: Jan. 6, 2023, 34 pages.

US Office Action, U.S. Appl. No. 17/719,828, Applicant: Manna et al., Mail date: Jun. 7, 2023, 22 pages.

US Office Action, U.S. Appl. No. 17/719,828, Applicant: Manna et al., Mail date: Dec. 27, 2023, 13 pages.

"Interrogate, v. (computing)", Cambridge Dictionary, 2021 (year: 2021).

US Office Action, U.S. Appl. No. 17/719,828, Applicant: Manna et al., Mail date: Jul. 11, 2024, 16 pages.

US Office Action, Application No. U.S. Appl. No. 17/719,828, Applicant: Manna et al., Mail date: Jan. 14, 2025. 17 pages.

US Office Action, U.S. Appl. No. 17/719,828, Applicant: Manna et al., Mail date: Oct. 16, 2025, 16 pages.

Promptcloud, Web Data Crawling vs Web Data Scraping, Copyright 2025 PromptCloud, GDPR compliant scraping, ISO 27001—certified data provider. Janet Williams, Jun. 12, 2024, Blog, Web Scraping, 17 pages.

* cited by examiner

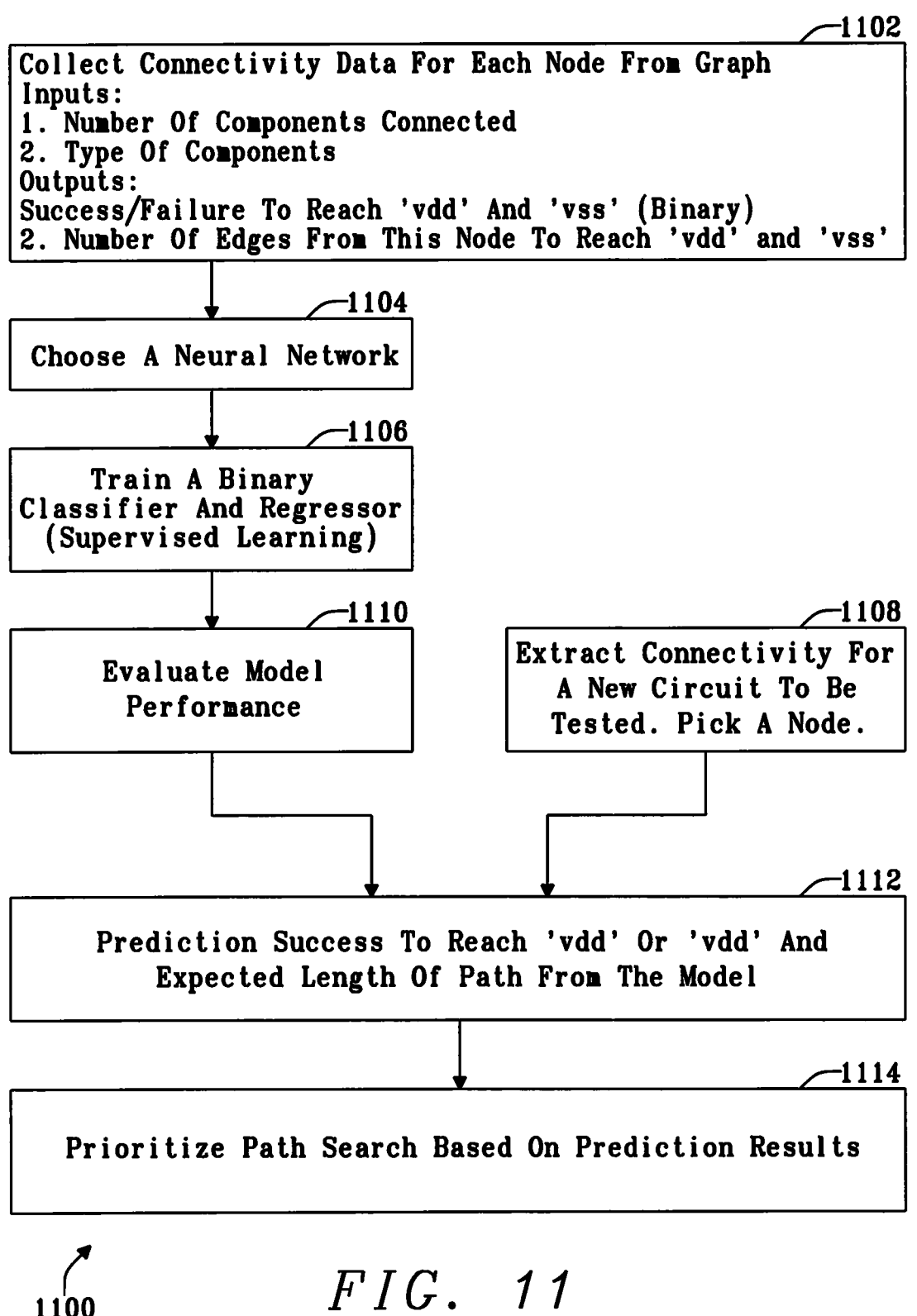

┌─ 1102
Collect Connectivity Data For Each Node From Graph
Inputs:
1. Number Of Components Connected
2. Type Of Components
Outputs:
Success/Failure To Reach 'vdd' And 'vss' (Binary)
2. Number Of Edges From This Node To Reach 'vdd' and 'vss'

┌─ 1104
Choose A Neural Network

┌─ 1106
Train A Binary
Classifier And Regressor
(Supervised Learning)

┌─ 1110
Evaluate Model
Performance

┌─ 1108
Extract Connectivity For
A New Circuit To Be
Tested. Pick A Node.

┌─ 1112
Prediction Success To Reach 'vdd' Or 'vdd' And
Expected Length Of Path From The Model ┌─ 1114
Prioritize Path Search Based On Prediction Results

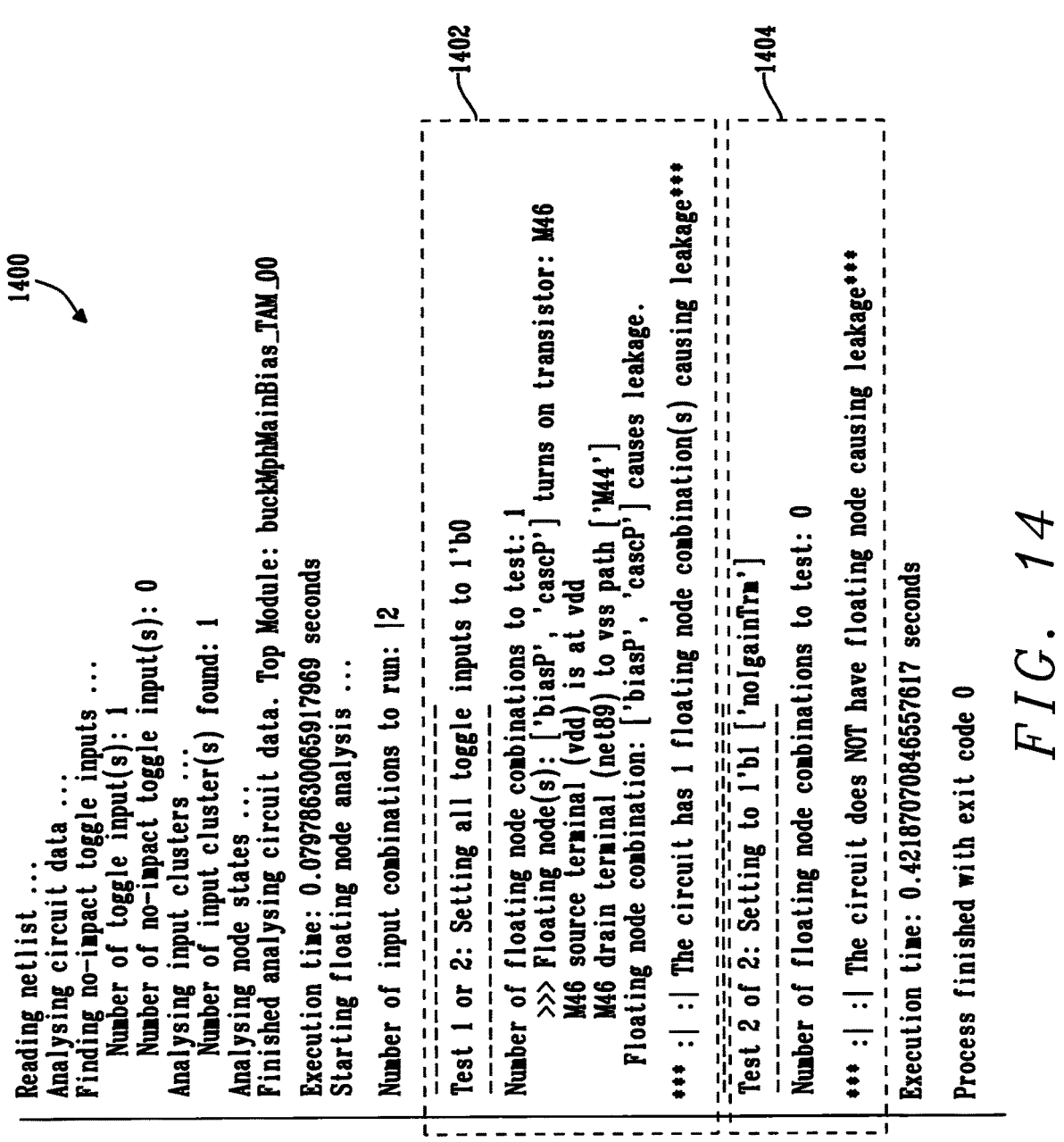

```
Reading netlist ....
Analysing circuit data ...
Finding no-impact toggle inputs ...
    Number of toggle input(s): 1
    Number of no-impact toggle input(s): 0
Analysing input clusters ...
    Number of input cluster(s) found: 1
Analysing node states ...
Finished analysing circuit data. Top Module: buckMphMainBias_TAM_00

Execution time: 0.079786300065917969 seconds
Starting floating node analysis ...

Number of input combinations to run: |2

|Test 1 or 2: Setting all toggle inputs to 1'b0

Number of floating node combinations to test: 1
    >>> Floating node(s): ['biasP', 'cascP'] turns on transistor: M46
    M46 source terminal (vdd) is at vdd
    M46 drain terminal (net89) to vss path ['M44']
    Floating node combination: ['biasP', 'cascP'] causes leakage.

*** :| :| The circuit has 1 floating node combination(s) causing leakage***

|Test 2 of 2: Setting to 1'b1 ['nolgainTrm']

Number of floating node combinations to test: 0

*** :| :| The circuit does NOT have floating node causing leakage***

Execution time: 0.42187070708465557617 seconds

Process finished with exit code 0
```

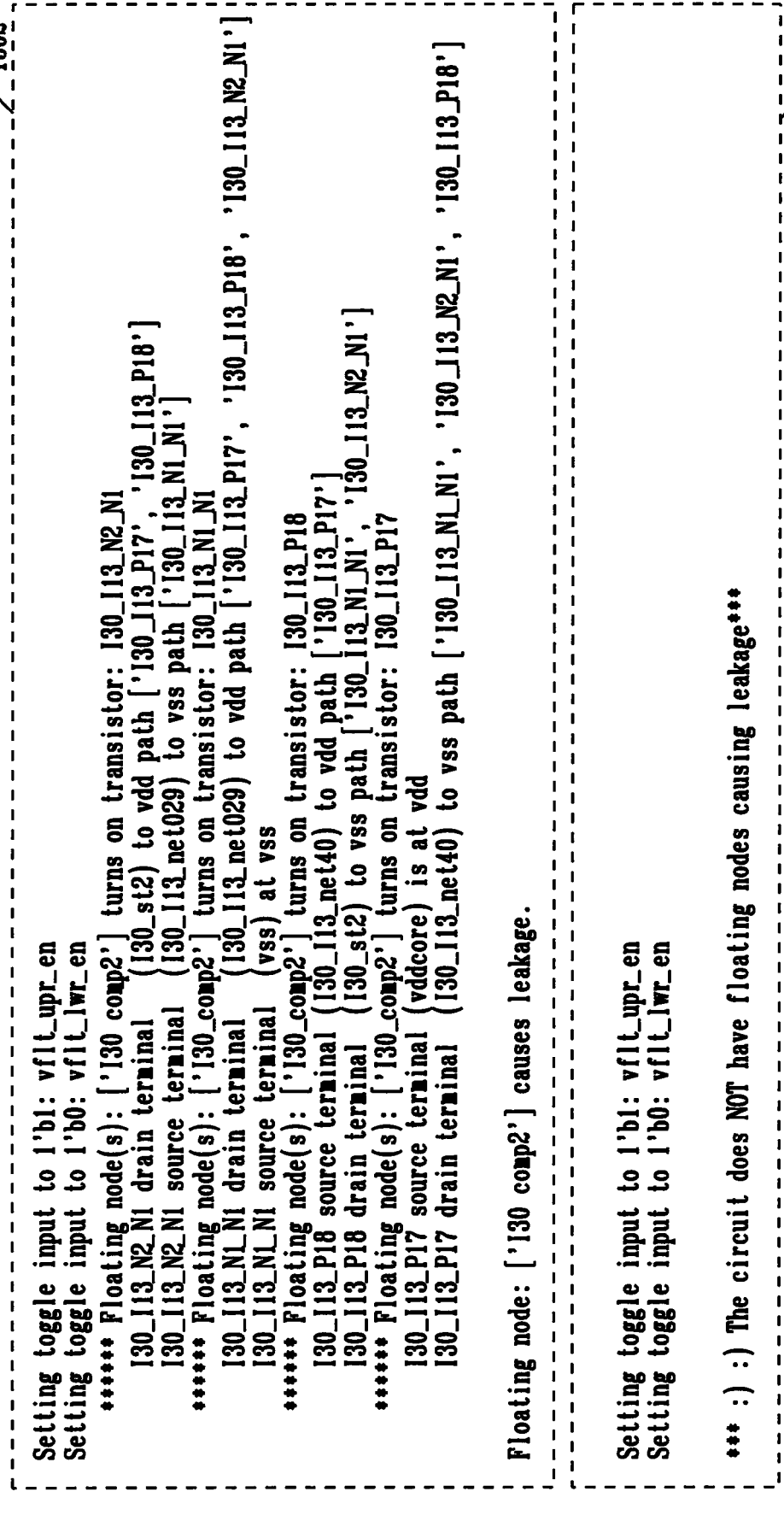

```
Setting toggle input to 1'b1: vflt_upr_en
Setting toggle input to 1'b0: vflt_lwr_en

****** Floating node(s): ['I30 comp2'] turns on transistor: I30_I13_N2_N1
    I30_I13_N2_N1 drain terminal    (I30_st2) to vdd path ['I30_I13_P17','I30_I13_P18']
    I30_I13_N2_N1 source terminal   (I30_I13_net029) to vss path ['I30_I13_N1_N1']

****** Floating node(s): ['I30_comp2'] turns on transistor: I30_I13_N1_N1
    I30_I13_N1_N1 drain terminal    (I30_I13_net029) to vdd path ['I30_I13_P17', 'I30_I13_P18', 'I30_I13_N2_N1']
    I30_I13_N1_N1 source terminal   (vss) at vss

****** Floating node(s): ['I30_comp2'] turns on transistor: I30_I13_P18
    I30_I13_P18 source terminal  (I30_I13_net40) to vdd path ['I30_I13_P17']
    I30_I13_P18 drain terminal   (I30_st2) to vss path ['I30_I13_N1_N1', 'I30_I13_N2_N1']

****** Floating node(s): ['I30_comp2'] turns on transistor: I30_I13_P17
    I30_I13_P17 source terminal  (vddcore) is at vdd
    I30_I13_P17 drain terminal   (I30_I13_net40) to vss path ['I30_I13_N1_N1', 'I30_I13_N2_N1', 'I30_I13_P18']

Floating node: ['I30 comp2'] causes leakage.
```

```
Setting toggle input to 1'b1: vflt_upr_en
Setting toggle input to 1'b0: vflt_lwr_en

*** :) :) The circuit does NOT have floating nodes causing leakage***
```

FIG. 15

METHODS AND SYSTEMS FOR FLOATING NODE DETECTION

TECHNICAL FIELD

The present disclosure relates to methods and systems for floating node detection, and in particular to methods and systems for detecting problematic floating nodes in an electronic circuit or electronic circuit design.

BACKGROUND

A node of an electric or electronic circuit which is not driven to a defined high or low level is commonly referred to as a floating node. Floating nodes are undesirable in circuits since they can cause problems, such as leakage currents in downstream logic circuits, noise coupling and generally unpredictable and unreliable circuit behaviors. For example, a floating node may, under certain stimulus conditions, provide low-resistance discharge paths between a high (or positive) supply voltage node Vdd and a low (or negative) supply voltage node Vss, resulting in a leakage current. Floating nodes are particularly undesirable if they are coupled a controlling input of a switch, such as the gate of a MOSFET, since they may result in the switch being turned on unintentionally and provide said discharge or leakage paths.

Rectification of floating nodes is often expensive in terms of time and money, especially when they are identified late in the design or after silicon is fabricated. Rectifying a floating node identified late in the design process, or which escapes into silicon can often lead to unexpected time delays and costs in production, since it may be necessary to repeat the calibration and characterization of the device, replace mask sets and so on. Therefore, it would be desirable to be able to identify and rectify floating nodes as early as possible.

For simple circuits, the use of best design practices which avoid specific structures known to generate floating nodes can be used to ensure that there are no floating nodes. For a long time, peer review was the conventional way of identifying floating nodes in a circuit design. However, manual analysis of each node is clearly not scalable to the number of nodes present in a modern electronic chip, which can comprise nodes in the order of magnitude of thousands or more.

There are available some commercial static analytical tools which use circuit topology analyzers to find structures that are likely to result in floating nodes. However, these tools only allow detection of "static" floating nodes; nodes that are physically de-coupled. This is as opposed to "dynamic" nodes which become de-coupled from the power supplies during operation due, for example, to a specific input configuration. Therefore, such static node detection modes can only identify a limited number of cases.

Other methods employ complicated simulations to detect both static and dynamic floating nodes, however such methods require building and solving a system of nonlinear differential equations that describe fine behavior of the simulated components. Current state-of-the-art simulation methods to detect floating nodes generally rely on heavy SPICE simulations in which an external voltage or current source is applied at each node, in order to bring it up at or near Vdd/2. If a node has no low-resistance path to Vdd or Vss to clamp the voltage, this will cause a crowbar current to flow in CMOS stage(s) connected to the node and a large leakage current is expected to be detected between Vdd and Vss. While these methods can detect floating nodes, they require extensive setup and simulation cycles and are therefore slow and expensive. Also, due to the complementary nature of NMOS and PMOS transistors, the excitation of floating nodes by external stimulus requires achieving precise mid-rail voltage levels to trigger crowbar currents. This can be a challenging and not always repeatable process.

Another significant limitation of the currently available commercial tools is that it can be very challenging to find specific combinations of floating nodes acting together. Many times, a single floating node acting alone may not cause a leakage current but two or more nodes acting together may open a leakage path. Finding the right combination of floating nodes by simulation in a circuit with many nodes often requires very large number of runs and is, therefore, prohibitively time-consuming and often impossible.

All known current simulation tools rely on the description of technology- or process-specific data and require a detailed setup. Moreover, the results of the analysis require manual interpretation and are not exhaustive.

In conclusion, current state-of-the-art methods have the disadvantage of being computationally expensive and having long runtimes. There is some flexibility in the tuning of the simulations to trade off the precision of the simulation in favor of execution speed, however this considerably reduces the likelihood of detecting floating nodes correctly. In most cases, these methods tend to return an unacceptably high number of false positives.

SUMMARY

Although current state-of-the-art simulation-based tools provide very detailed information on circuit behavior, most of such information is unnecessary for the purpose of identifying floating nodes. It would be desirable to provide a method and apparatus for identifying floating nodes in a circuit which allows for a reduced time and computational cost whilst not sacrificing floating node detection accuracy.

It is an object of the disclosure to address one or more of the above-mentioned limitations.

According to a first aspect of the disclosure there is provided, in an electronic data processing system, a method of creating a data structure that represents a circuit comprising a plurality of nodes connected via edges; where each node represents a node of the circuit, each edge represents a circuit component, and wherein the data structure can be traversed across all connected nodes.

Optionally, the method further comprises interrogating the data structure to find floating nodes.

Optionally, the data structure comprises a graph and traversing the data structure comprises crawling the graph.

Optionally, the method further comprises receiving an input circuit design, and transforming the circuit design to said data structure.

Optionally, said input circuit design comprises a netlist or other circuit structure description.

Optionally, the input further comprises a list of supply connected nodes. These may comprise one or more voltage ports.

Optionally, the data structure comprises a node connectivity representation which comprises any one of: an adjacency matrix, adjacency list, and an edge list.

Optionally, the data structure comprises an associative array with unique node names as keys and the value for each key is a connectivity list of component terminals connected to it.

Optionally, transforming the circuit design comprises flattening the netlist to a set of primitive circuit components.

Optionally, the supply connected nodes comprise at least one high power supply port and at least one low power supply port.

Optionally, the input further comprises a list of one or more input ports, wherein each of the input ports can be toggled between two or more input states.

Optionally, the method comprises updating the data structure for different combinations of input states.

Optionally, the step of interrogating the data structure to find floating nodes comprises: finding nodes which are not coupled with any supply connected node, and identifying those nodes as said floating nodes.

Optionally, identifying nodes which are not connected to any supply connected node comprises:

assigning a first test voltage to each node;

iteratively propagating a port voltage inside the data structure; and identifying those nodes which remain at the first test voltage after the propagation as nodes not coupled with any supply connected node.

Similar techniques could be applied to assign different states to the nodes in embodiments where voltages are not being represented.

Optionally, interrogating the data structure further comprises identifying candidate problematic floating nodes and stimulating each of the identified candidate problematic floating nodes; where said candidate problematic floating nodes are identified as confirmed problematic floating nodes if when stimulated a path exists between a high node and a low node as a result of the stimulation.

A high node and a low node may be high and low with respect to each other, that is, they can be simply two different voltages.

Optionally, the states may represent voltages.

Optionally, identifying candidate problematic floating nodes comprises selecting which nodes supply a control signal for a switch device which is selectively operable to control conductivity of a channel.

Optionally, each switch device comprises a first terminal and a second terminal, and for each switch device, the method comprises:

tracing a path from the first terminal to a first supply connected node and from the second terminal to a second supply connected node and then identifying a node as a problematic node causing leakage if both paths are found;

otherwise, if both paths are not found, tracing a path from a first terminal to the second supply connected node and from a second terminal to the first supply connected node and then if both paths are found, identifying the node as a problematic node causing leakage; and otherwise ignoring/discarding the node from the list of candidate problematic floating nodes.

Preferably, the first supply connected node is a high node and the second supply connected node is a low node. It will be appreciated that similar techniques can be used for switches with more than two terminals; any pair of terminals can be checked in this way. Also, there may be multiple supply connected nodes which may be classified as high or low ports, there does not have to be just one of each.

Optionally, stimulating each of the identified candidate problematic floating nodes to check if the stimulated node provides a leakage path comprises finding a shortest path in the data structure from the nodes to the supply connected nodes.

Optionally, the switch device comprises a transistor.

Optionally, during a data structure traversal, when a diode is encountered, a node adjacent to a first diode electrode is checked to see if it is also coupled with a second diode electrode taking into consideration the expected direction of current flow, were it to be included in a possible leakage path: then, if it is connected, the path search continues; and if it is not connected, the path search aborts.

Optionally, interrogating the data structure further comprises identifying combinations of candidate problematic floating nodes, and stimulating each of the identified combinations to check if any of the nodes in the stimulated combination provides a leakage path; where the nodes in the stimulated combination are identified as confirmed problematic floating nodes if a leakage path exists as a result of the stimulation.

Optionally, the candidate problematic floating nodes identified as confirmed problematic floating nodes are excluded from a list of candidate floating nodes; and thereafter the method comprises:

identifying combinations of the remaining candidate problematic floating nodes, and stimulating each of the identified combinations to check if any of the nodes in the stimulated combination provides a leakage path; where the nodes in the stimulated combination are identified as confirmed problematic floating nodes if a leakage path exists as a result of the stimulation.

Optionally, the method comprises iteratively identifying i confirmed problematic floating nodes based on successive new combinations.

Optionally, a combination of the remaining candidate problematic floating nodes is selected based on its adjacency to a previously identified node or combination of nodes.

Optionally, interrogation paths of the data structure are stored in memory and then have their results referenced in future interrogation events instead of being repeated.

Optionally, the interrogation paths of the node connectivity representation which are stored in memory comprise a list of paths searched which did not lead from a node to a supply connected node.

Optionally, connectivity statistics for each node are collected as training data and fed into a machine learning model to predict the leakage causing probability of each node.

Optionally, a result from the prediction is used to prioritize nodes during next interrogation to reduce the time taken to identify a path to a supply connected node.

Optionally, a neural network model is trained with number and type of components as inputs and is used to predict path length and probability of success to reach a supply connected node from a given node based on the connectivity information associated with it.

Optionally, based on the predictions of the model, a shortlist of nodes and possible paths are identified and searched first for the shortest path to one or more of the supply connected nodes.

Optionally, as the data structure is initially traversed in search of a supply connected node, each node is updated with a value score that reflects its worthiness of being in a leakage path.

Optionally, interrogation of the data structure comprises following a path of nodes that have successively increasing value scores.

According to a second aspect of the disclosure there is provided a data structure for an electronic data processing system, which represents a circuit and comprises a plurality of nodes connected via edges; where each node represents a node of the circuit, each edge represents a circuit component, and wherein the data structure can be traversed across all connected nodes.

The disclosure may also provide a floating node detection system, comprising the data structure of the second aspect and a floating node identification tool configured to interrogate the data structure to find floating nodes.

The data structure and floating node detection systems may incorporate the various features of the method of the first aspect as mentioned above.

BRIEF DESCRIPTION OF THE DRAWINGS

The disclosure is described in further detail below by way of example and with reference to the accompanying drawings, in which:

FIG. 11 is a schematic diagram of a first machine learning method for use in combination with the floating node detection methods of the present disclosure;

FIG. 14 shows a test in which the methods of the present disclosure are applied;

FIG. 15 shows another test in which the methods of the present disclosure are applied.

DESCRIPTION

Figure 1:
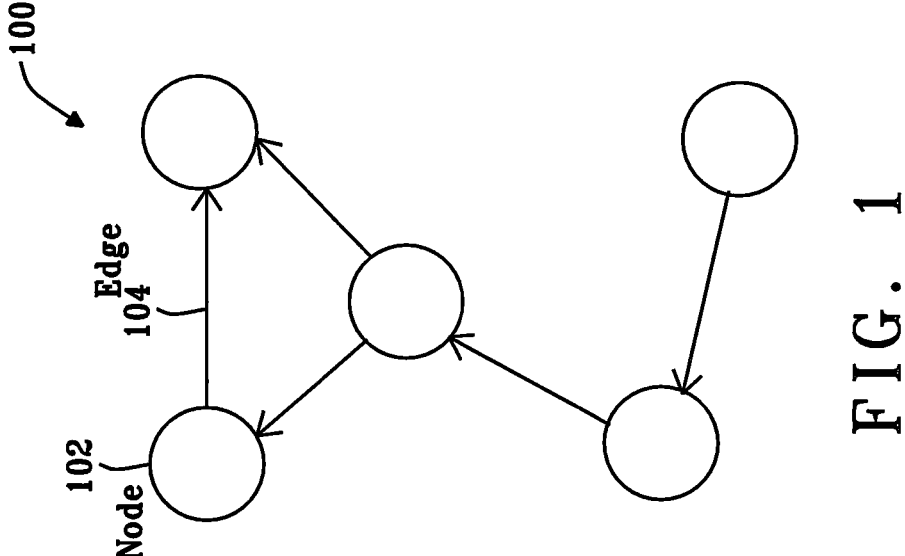
FIG. 1 shows a data structure according to a first aspect of the present disclosure.

The present disclosure provides a novel way of representing electronic circuits. As seen in FIG. 1, a circuit 100 can be represented with a data structure that comprises a plurality of nodes 102 connected via edges 104. The nodes may be alternatively referred to as vertices or points, and the edges may be alternatively referred to as links or lines. Each node 102 represents a circuit node such as a terminal of a circuit component, and each edge 104 represents a path through a circuit component. The edges 104 are preferably directed edges, as shown by the arrows in the figure, with the directionality representing a direction of current flow. The direction of a specific edge 104 can change as the input conditions change, as discussed further below.

It is also possible for a component to contribute more than one edge, for example a double switch with two input terminals and two output terminals, or a MOSFET with one gate controlling two channels.

The data structure 100 can be configured. For example, edges between nodes can be modified, added or removed based on the value at another node.

The data structure is created so that it can be traversed across all connected nodes. A traversal is a journey (episode) that starts as a certain node, follows the direction of edges outgoing from that node, reaches another node (and so on) and finally reaches a destination node. The traversal can be going against the direction of the edges or along the direction of the edges (the direction of the edges may represent direction of current flow in preferred embodiments). This data structure provides useful capabilities for circuit analysis. One particular example application area is the detection of floating nodes. The data structure can be interrogated in order to find floating nodes.

Interrogating the data structure is achieved by a data processing system provided with instructions which can trace a path through successive nodes in the structure.

An example crawling method may be described as follows:
1. It starts at a given node of the data structure.
2. It looks at all edges connected to the node. Each edge represents a conducting device (under the specific stimulus set-up condition).
3. The edges can be incoming (i.e. depositing charge at this node) or outgoing (i.e. transporting charge out of this node).
4. It picks an outgoing edge (if it crawls along the direction of current, such as to find a Vss destination) and reaches the other side of the edge (which is another node). Alternatively, it may also pick an incoming edge (if it crawls against the direction of current, such as to find a Vdd destination)
5. It repeats the steps 1-4 for the newly arrived node and continues though the data structure following the same rule until it reaches its destination (in this case a Vdd or Vss node).
6. The crawling is deemed to be successful if it reaches its intended destination (Vdd or Vss) or it can be deemed to be unsuccessful if it reaches a dead end (such as another floating node or an unconnected input node.

Advantageously, the present disclosure may provide for the transformation of an existing recorded circuit design to have the form of the data structure of the disclosure. A circuit representation tool (which may comprise a floating node detection tool) may receive an input circuit design and apply the transformation to create a data structure with the appropriate properties. The input circuit design may comprise a netlist, which is a known structured text or other circuit description listing all the components of the circuit and the nodes that they are connected to.

Figure 2:
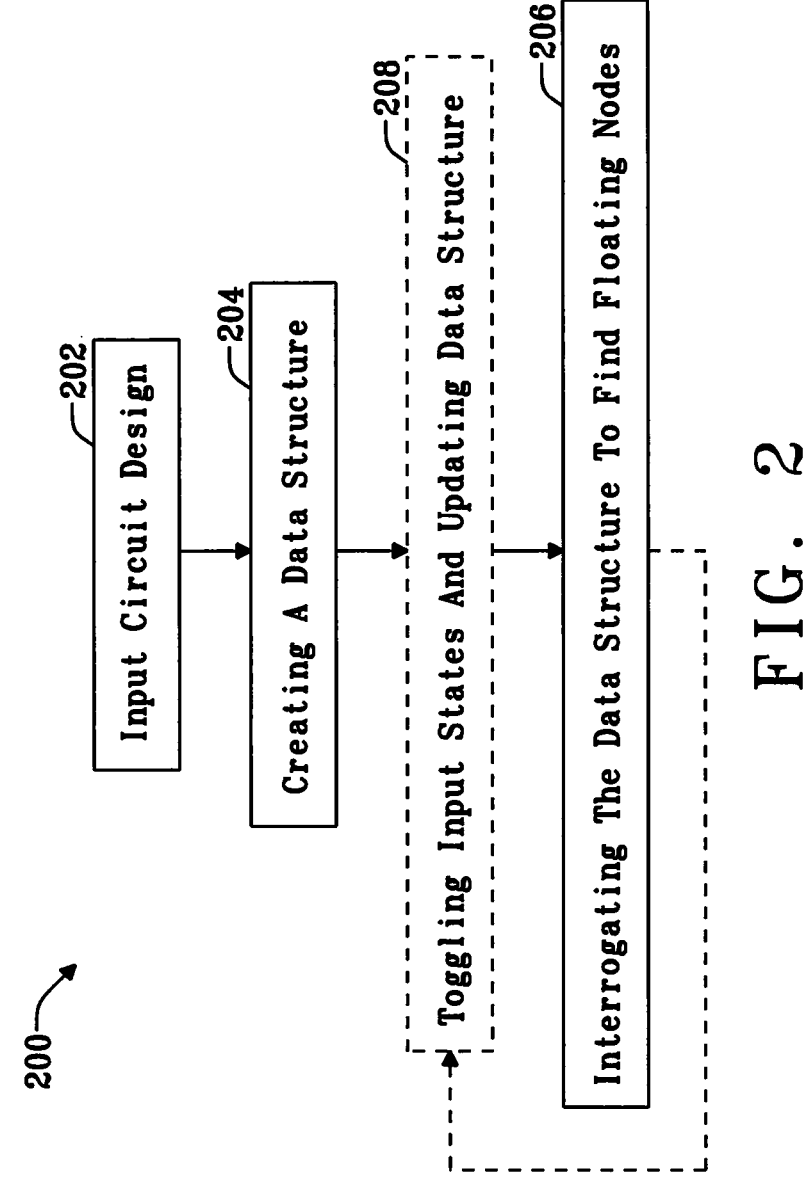
FIG. 2 is a flow chart of a floating node detection method according to some embodiments.

FIG. 2 shows a floating node detection method 200 according to this embodiment. An input circuit design 202 may comprise a netlist, which is transformed 204 to create a data structure. This data structure can be interrogated 206 to find floating nodes. FIG. 2 also illustrates an optional additional step 208 of toggling input states and updating the data structure, which step can be repeated after interrogation 206, for example being repeated for each different combination of input states until a certain condition is met. For example, the condition may be that a certain runtime or a certain number of attempts has been reached. In preferred embodiments, the method 200 is run iteratively until all possible combinations of input states have been tested. The method may be implemented by an algorithm which is configured to halt execution each time one or more nodes are detected at step 206; implement a circuit fix and then re-run the algorithm from the start.

Circuit components are generally represented in a netlist as cells or blocks having one or more terminals. The components may be for example transistors, resistors, capacitor, integrated circuit chips, and so on. For each type of component, multiple instances will generally be present in a circuit. In most representations, a netlist will therefore comprise at the very least of one or more instances of different types of components and their connections, each instance having a predefined number of terminals based on the component type.

The netlist may comprise components and their connections. The components may include for example instances of resistors, inductors, transistors, capacitors or diodes, to name just a few. The netlist may comprise both primitive and non-primitive circuit components and in some embodiments the step 204 may comprise flattening the netlist to a set of primitive components.

The input may further comprise a list of supply connected ports, which may represent voltages. The supply connected ports may comprise one or more high voltage supply ports and one or more low voltage supply ports. Hereinafter the high and low voltage supply ports may also be referred to as Vdd and Vss respectively.

It will be appreciated that a netlist may comprise multiple sub-netlists, such as multiple blocks, modules or files, which combined provide the netlist.

In some embodiments, the data structure comprises a circuit graph and interrogating the data structure comprises crawling the circuit graph via one or more crawling episodes.

The data structure may comprise a node connectivity representation which may comprise any of an adjacency matrix, adjacency list, and an edge list and may be constructed in various ways. For example, the data structure may comprise an associative array in which the keys are the nodes names and the key of each key is a connectivity list of device component terminals connected to it.

In addition to the power supply ports, in most circuits the supply connected ports comprise one more input or control ports which configure and control the circuit operation. For example, a circuit may have one or more digital input ports which can be toggled between two states and which are used to provide functionality such as to control transistors or switches in the circuit. The state of the digital inputs may be driven by registers or non volatile memory settings. Different combinations of input states may result in different connections between the circuit components and therefore in different data structures.

In some embodiments, floating nodes may be identified as nodes which do not have a path to any voltage port.

Figure 3:
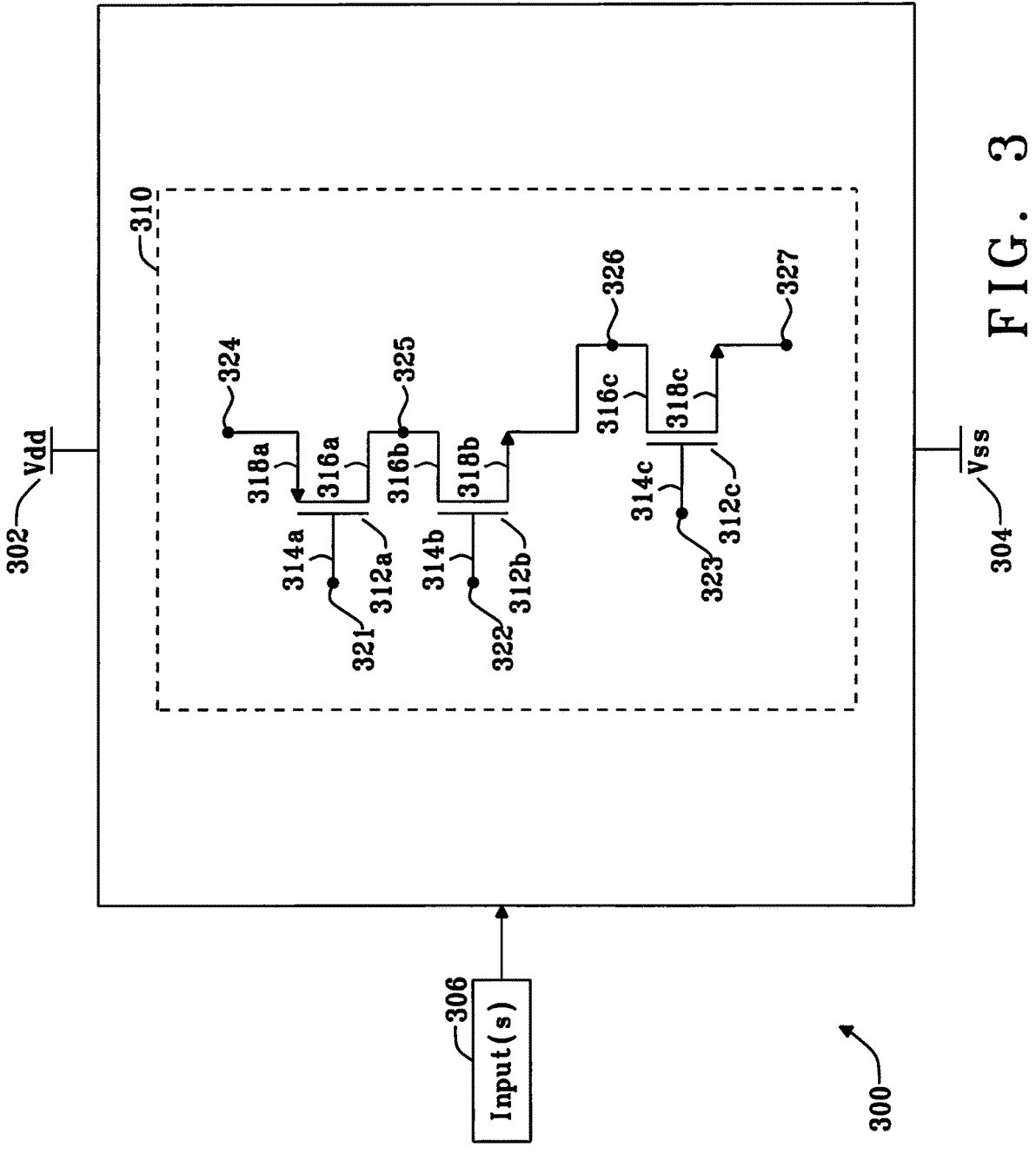
FIG. 3 is a schematic diagram of a circuit comprising a circuit portion.

FIG. 3 is a schematic diagram of a circuit 300 comprising a circuit portion 310. The circuit portion 310 comprises three components: a first transistor 312a, a second transistor 312b and a third transistor 312c. Each transistor has a first terminal or gate 314i, a second terminal or drain 316i and a third terminal or source 318i, where i=a, b, c. The second terminal 316b of the transistor 312b is coupled to the second terminal 316a of the first transistor 312a at a node 325. The second terminal 316c of the third transistor 312c is coupled to the third terminal 318b of the second transistor 312b at a node 326. The third terminal 318a of the first transistor 312a is coupled to a node 324 which may be coupled to other components or blocks of the circuit 300 (not shown). Similarly, the third terminal 318c of the third transistor 312c is coupled to a node 327 and the terminals 314a, 314b, 314c of transistor 312a, 312b, 312c are coupled to nodes 321, 322, 323 respectively, where each node may be connected to other circuit components or blocks (not shown).

The circuit 300 is coupled to a high power supply port 302 (Vdd) and to a low power supply or ground port 304 (Vss). It will be appreciated that even though only one low power supply port and one high power supply port are shown in the figure, the circuit 300 may be coupled to more supply ports.

The circuit 300 may also be coupled to one or more input ports 306. For example, the input port(s) 306 may be digital control input ports driven by registers or non-volatile memory settings which are used to configure and control the circuit 300 via a connection to one or more internal nodes.

All nodes of the circuit 300 which do not have an electrically connected path to any voltage port are floating. If one or more of the nodes 321, 322, 323 coupled to the gates of the transistors 312i are floating, the corresponding transistor may turn on under certain stimulus conditions. For example, if node 322 is floating and charge builds-up at the gate 314b of the transistor 312b, the transistor 312b may turn on. Cross-coupling from connections with other nodes and components may also result in the turn-on of the transistor 312b when node 322 is floating.

Depending on the connections in the circuit, the unexpected turn-on of transistor 312b may provide a shorting path between Vdd and Vss and result in a leakage current flowing in the circuit, which would lead to an efficiency reduction and, potentially, unexpected circuit behavior. In such case the floating node 312b would be considered to be problematic. If no shorting path between Vdd and Vss is created by the unintentional switch-on of transistor 312a, then the floating node 312a is considered to be harmless or non-problematic.

Figure 4:
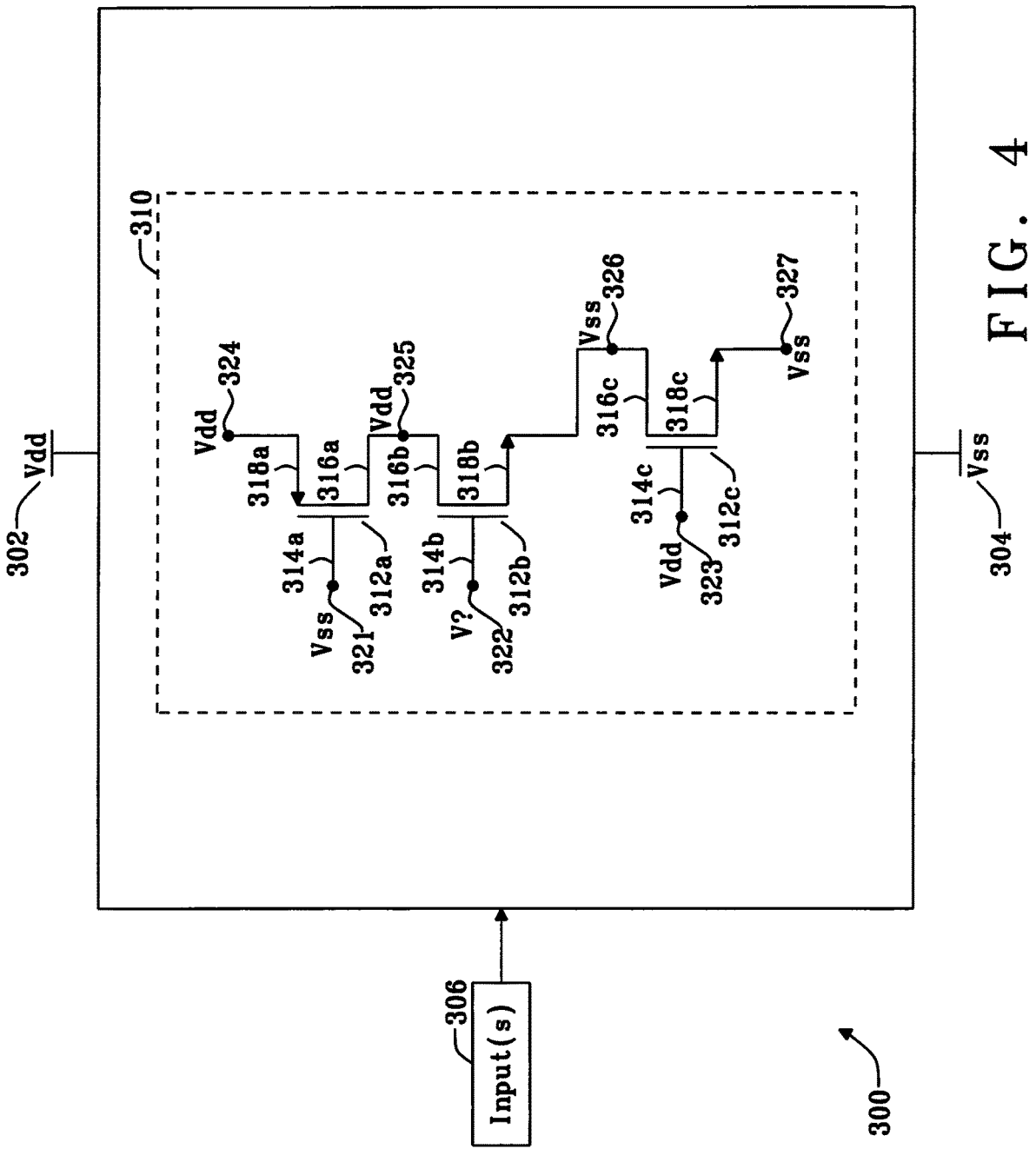
FIG. 4 is a schematic diagram of the circuit of FIG. 3 illustrating propagation of states at different nodes for a specific connection configuration.

An example scenario in which the circuit 300 has a floating node is shown in FIG. 4. FIG. 4 is a schematic diagram of the circuit 300 illustrating voltages at different nodes for a specific connection configuration. In the example of FIG. 4 nodes 324 and 323 have an electrical path (not shown) to Vdd and nodes 321 and 327 have an electrical path (not shown) to Vss. The transistors 312a and 312c are on and therefore nodes 325 and nodes 326 are at potential equal to Vdd and Vss respectively. In the present example, since the potential of node 322 is unknown, transistor 312b may turn on and provide a leakage path between node 325 and node 326. The existence of a shorting path between node 325 and node 326 may also be influenced by a combination of input ports 306 or other stimulus conditions.

The connection information of circuit 300 may be represented via a directed graph in which each node of the circuit 310 is represented as a graph node and each device, such as transistor, diode, resistor, provides one or more possible paths in or out the node. An example of this is illustrated in FIG. 5.

Figure 5:
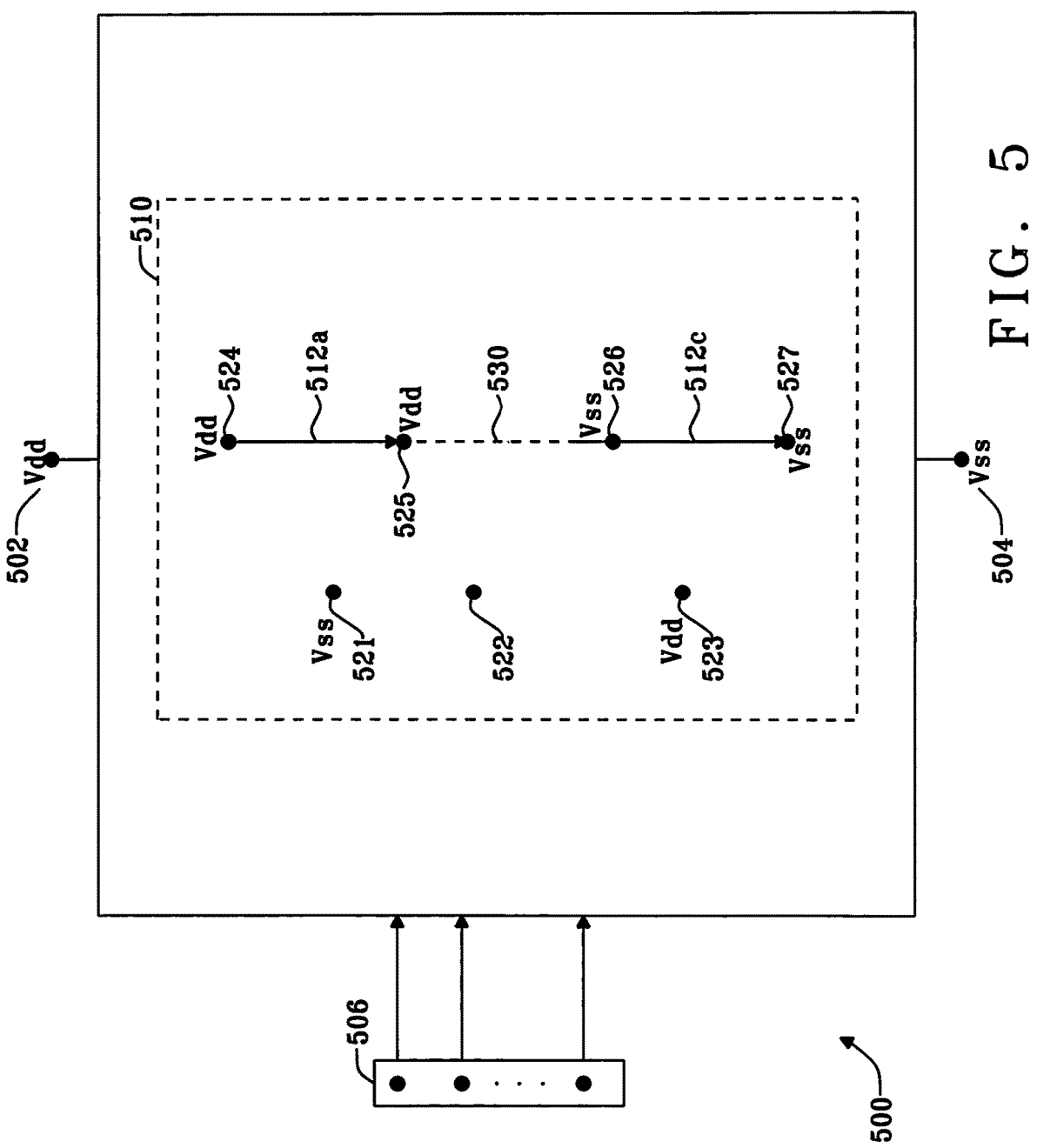
FIG. 5 is a directed graph illustrating the connection information of the circuit portion of FIG. 3 under the connection configuration of FIG. 4.

FIG. 5 is a directed graph illustrating the connection information, or netlist, of the circuit portion 310 under the connection configuration of FIG. 4. The graph 500 comprises a graph portion 510 which correspond to the circuit portion 310. The graph portion 510 comprise graph nodes 521, 522, 523, 524, 525, 526, 527 which correspond to circuit nodes 321, 322, 323, 324, 325, 326, 327 respectively. The graph 500 further comprises graph nodes Vdd (502) and Vss (504) which correspond to the power supply ports 302 and 304; and one or more graph input nodes 306 which correspond to the input ports 306.

The graph 500 further comprises a first edge (or line or link) 512a which links node 524 and node 525 and corresponds to transistor 312a; and a second asymmetrical edge 512c which links node 526 and node 527 and corresponds to transistor 312c. The directionality of edge 512a and 512c is dictated by the properties of the circuit devices and by the stimulus conditions of the circuit 300 in the present example.

In directed graphs such as the graph 500 of FIG. 5, a Hamiltonian path (or traceable path) is a path that visits each node exactly once. By crawling the edges of graph 500 it is possible to reconstruct paths between two different nodes. If two graph nodes are connectable by a path, then the two corresponding circuit nodes are connected by an electrical path in the circuit 300. Any graph node of circuit 300 that does not have a path to either Vdd or Vss corresponds to a floating circuit node.

In the present example, graph nodes 524 and 523 are connected to graph node 502 by a path (not shown in the figure) which corresponds to the electrical path between circuit nodes 324 and 323 and the power supply port 302. Graph nodes 521 and 527 are connected to graph node 504 by a path (not shown in the figure) which corresponds to the electrical path between circuit nodes 321 and 327 and the power supply port 304.

Because circuit node 322 is floating and the state of transistor 312b is not known, there is may or may not be an edge between graph node 525 and graph node 526. A dashed line 530 indicates that there may or may not be an edge between the two nodes, depending on whether the floating node 322 causes the transistor 312b to turn on and cause the edge 530 to be present. In other words, the dashed line 530 indicates a conditional edge dependent on the state of node 522.

The floating node 322 can be stimulated, that, is the node 322 is set to a voltage which can turn on the transistor 312b. The on state of transistor 312b can be represented in graph 500 by a corresponding edge being added at 530 between graph nodes 525 and 526. The graph 500 may then be crawled to check whether a path from one of the terminals 316b or 318b to Vdd is provided and a path from the other terminal among 316b and 318b to Vss is also provided. If and only if both such paths are found with the channel of the stimulated transistor bridging them, the node 322 is identified as a problematic floating node, since it may cause leakage, whereas is any of such paths cannot be found, then the floating node 322 is considered harmless.

It will be appreciated that in other more complex circuits a floating node may be coupled to multiple transistors. In that case, each of the transistors would be turned on when the node is stimulated.

Figure 6:
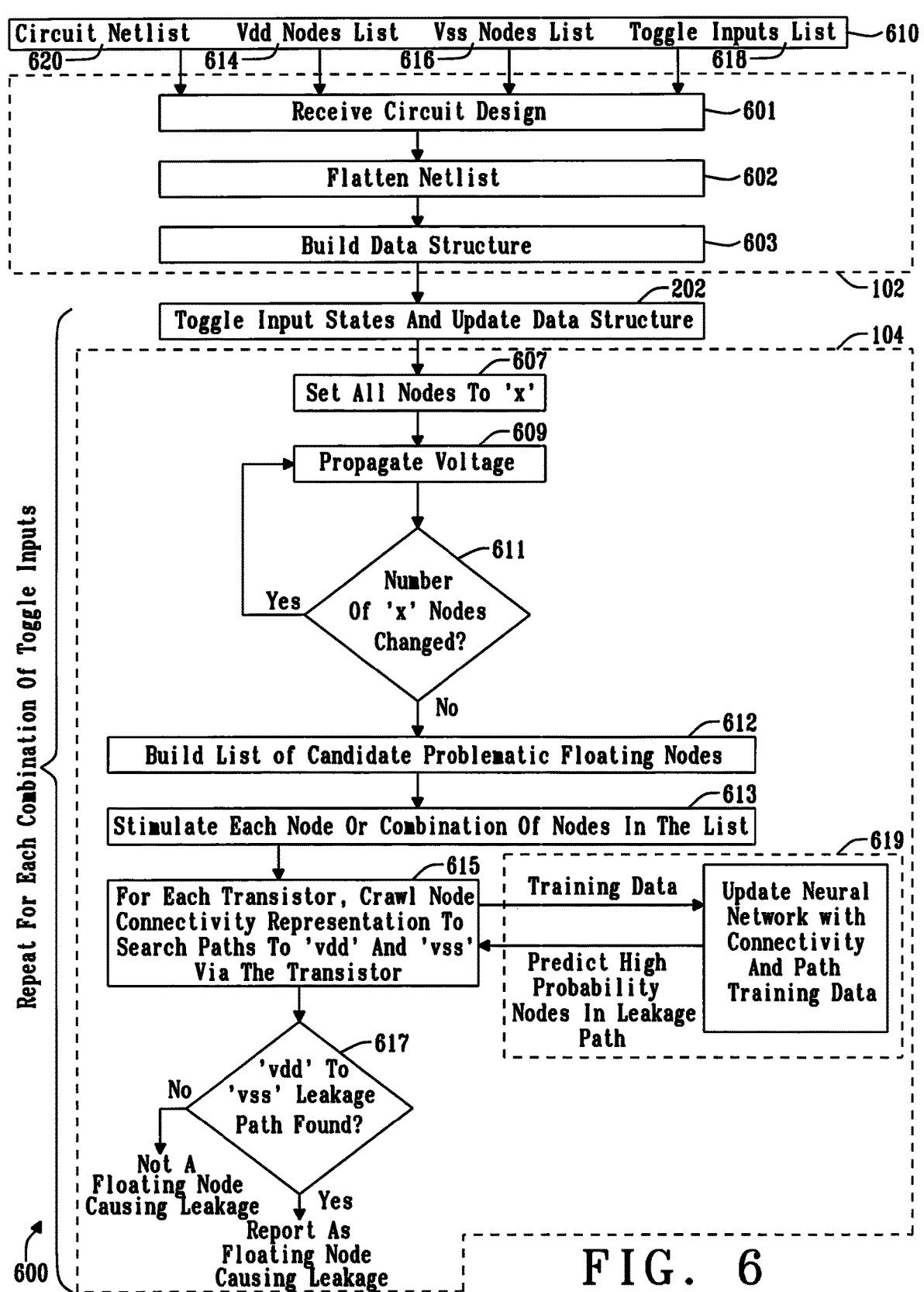
FIG. 6 is a flow chart of a specific embodiment of the method of FIG. 2.

FIG. 6 is a flow chart of a method 600 for detecting problematic floating node according to one illustrative specific example of an embodiment of the disclosure. Common features between figures in this disclosure are represented by common reference numerals/variables.

At step 601 a circuit design input 610 comprises a circuit netlist 620, a Vdd nodes list 614, a Vss nodes list 616 and a toggle inputs list 618. Typically, a toggle input list is a list of digital control inputs driven by registers or non-volatile memory settings.

Alternatively, the step 202 of toggling input states and updating the data structure may be controlled by the 'Toggle inputs list' 618 and the step 609 of propagating voltage can be controlled by the nodes lists 614, 616; so these aspects don't impact on the generation of the data structure (item 102) but are rather applied to it once it is built.

At step 602, the netlist 612 is flattened so that the netlist only comprises primitive components. It will be appreciated that in other embodiments the netlist may not be fully flattened or may not be flattened at all.

At step 603, a data structure is built. In particular, in this specific embodiment the data structure comprises an adjacency matrix, though other representations may be used as explained previously.

At step 202 the input states are toggled and the data structure is updated based on the toggle inputs states and the knowledge of circuit topology.

At step 607, all nodes in the data structure are assigned a first test voltage value 'x'.

At step 609, the voltages of the voltage ports are propagated to the inside nodes of the circuit through the circuit components, such as transistors, diodes and resistors, that may be conducting under a specific input stimulus condition.

At step 611, if the number of nodes with first test voltage 'x' has changed, the propagation step 609 is repeated, otherwise the voltage propagation is terminated. All nodes which still have first test voltage 'x' after the voltage propagation is terminated may be identified as floating nodes.

At step 612, a list of candidate problematic floating nodes is initialized.

At step 613, each node or combination of nodes in the list of candidate problematic floating nodes is stimulated by turning on any transistor connected to the node or nodes in the combination of nodes.

It will be appreciated that the combinations of nodes may be tested in any order.

At step 615, for each transistor which is turned on by the stimulation of the node or combination of nodes, the data structure is crawled to determine whether the turned on transistor can cause a leakage path or short, i.e. a path, between one of the high power ports Vdd and one of the low power ports Vss. A leakage path between Vdd and Vss exists if it is possible to find a path from the terminals of the stimulated transistor to both Vdd and Vss, with one terminal having a path to Vdd and the other terminal having a path to Vss. If both and only if both such paths are found with the channel of the stimulated transistor bridging them, a leakage path is caused by the turned-on transistor. Step 615 is repeated recursively for each transistor coupled to the node or nodes in the combination of nodes until a leakage path is found or until all transistors have been examined.

At step 617, if, a leakage path was found, the stimulated node or combination of nodes is identified as problematic; otherwise, the node or combination of node is identified as harmless.

Optionally, each time a node or combination of nodes is identified as being problematic, the node or nodes in the combination are removed from the list of candidate problematic floating nodes, so that they will not be considered in subsequent combinations. In preferred embodiments, all nodes are first stimulated alone and then the remaining nodes are examined in combinations, so that runtime is minimized.

The order in which the combinations of nodes with a first test voltage 'x' are stimulated may be random or may follow pre-determined rules which favor examining first combination of nodes which are more likely to result problematic so as to reduce runtime. The method may comprise using machine learning to collect data on which combinations of nodes are more likely to cause leakage paths and favor examining such combinations first in subsequent executions.

Steps 202 and 104 of the method 600 are repeated for each different combination of input states. Typically, the input ports will consist of digital control inputs which can be toggled between a low logic state or 0 and a high logic state or 1. The low state may correspond for example to setting the input port at a voltage Vss and the high state may correspond to setting the input port at a voltage Vdd. For N digital input ports, the number of possible input state combinations would then be $2^N$. For example, if the input ports comprise three ports a2, a1 and a0, there would be 8 possible combinations:

1. a2=0, a1=0, a0=0
2. a2=0, a1=0, a0=1
3. a2=0, a1=1, a0=0
4. a2=0, a1=1, a0=1
5. a2=1, a1=0, a0=0
6. a2=1, a1=0, a0=1
7. a2=1, a1=1, a0=0.
8. a2=1, a1=1, a0=1.

A counter running from 0 to $2^N-1$ may be used to loop through the above combinations. It will be appreciated that the order in which the combinations are tested may vary and that analogous considerations as stated for the order in which combinations of nodes are stimulated apply to the order in which combinations of input states are selected.

Optionally, the method 600 may comprise using machine learning to speed up the crawling step 615. For example, the method 600 may comprise a step 619 at which connectivity statistics data are collected as training data and fed into a machine learning model to predict the leakage causing probability of each node. The result from the prediction is used to prioritize nodes during the next execution of the crawling step 615 to reduce the time taken to identify a path to Vdd or Vss.

Some steps of the method 600 will now be discussed in more detail with reference to FIGS. 7 to 9.

Figure 7:
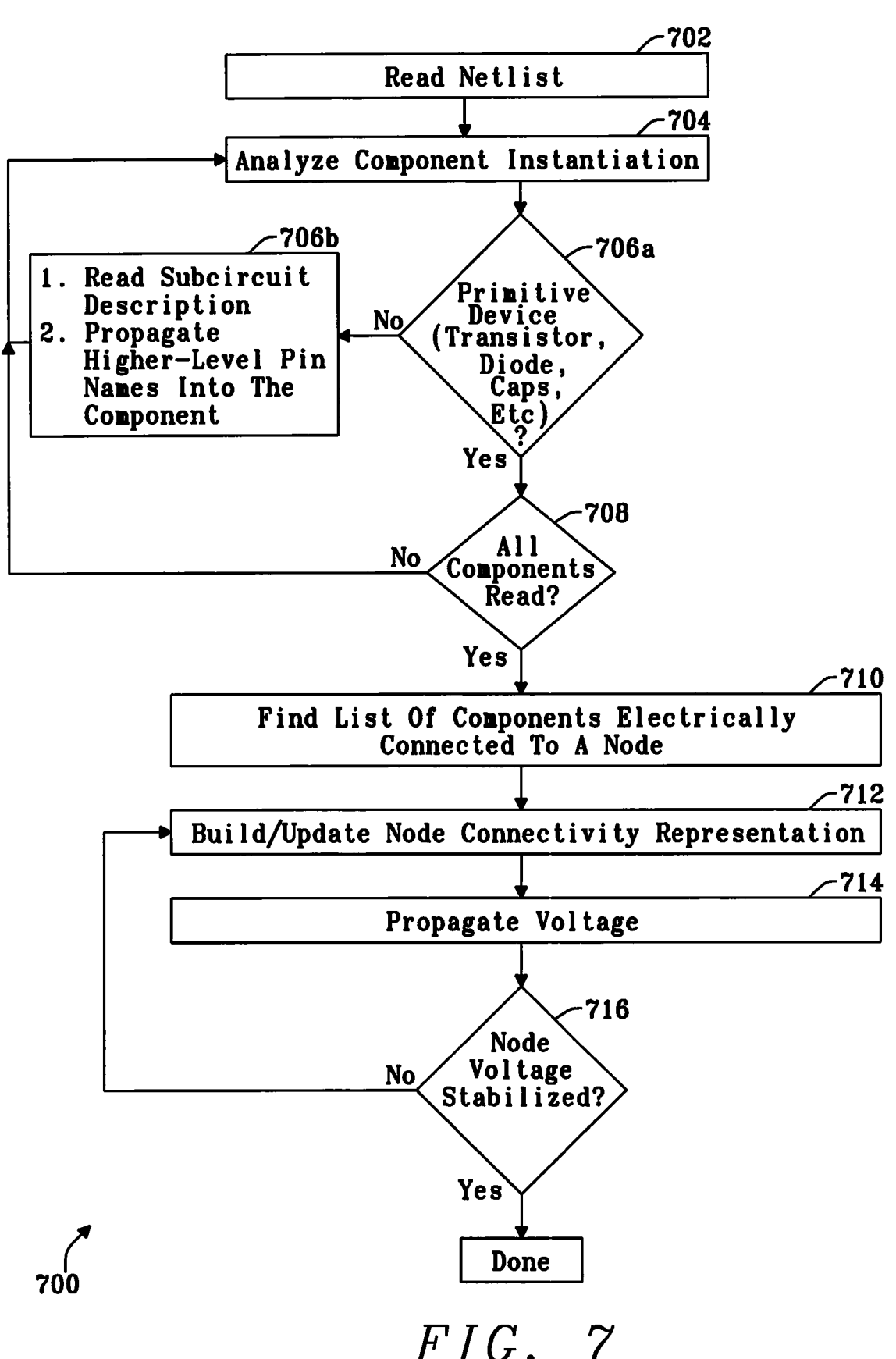
FIG. 7 is a flow chart of a method for building a node connectivity representation from a netlist and propagating the states inside the node connectivity representation.

FIG. 7 is a flow chart of a method 700 for building a data structure from a netlist and propagating the port voltages inside the data structure. The method 700 may be used as part of or in combination with the method 600.

At step 702 a netlist is received in input and read. The netlist comprises multiple instances of different components. At step 704 the components instantiation is analyzed to detect non primitive components. At step 706, all components in the netlist are read (706a) and non-primitive components are recursively unrolled, or flattened, into their sub-components (706b). Flattening a component into its sub-components may comprise reading the sub-circuit description of the component and propagating higher-level pin names into the non-primitive component. The non-primitive component is then replaced in the netlist with its sub-components, which may or may not be primitive devices. Steps 704, 706a and 706b are repeated until all components in the netlist are primitive.

In some embodiments, primitive devices may comprise transistors, diodes, resistors, capacitors and inductors. However, different selections of components may be defined as being "primitive" as desired.

Once all components have been read (step 708) and there are no more non-primitive components, all components connected to a node are identified (step 710). At step 712, a data structure is built. This may be for example an associative array having as keys unique node names and as value for each key a list of component terminals connected to the node.

Initially all nodes in the data structure are assigned a test voltage 'x' (i.e. all are assumed to be floating). If any of the components terminals or nodes in the data structure are directly connected to a power supply port Vdd or Vss, they are immediately updated with the appropriate voltage value so that subsequent voltage propagation and crawling steps of the methods according to the present disclosure are expedited. At step 714 the port voltage(s) are propagated inside the data structure. At step 716, if the voltage of all nodes is stabilized, that is, if the number of nodes with test voltage 'x' is unchanged, the voltage propagation is terminated; otherwise steps 712 and 714 are repeated.

FIG. 8A through 8D illustrate how the voltage propagation step 609 of the method 600 may be implemented for a portion 810 of a circuit 800.

Figures 8A, 8B:
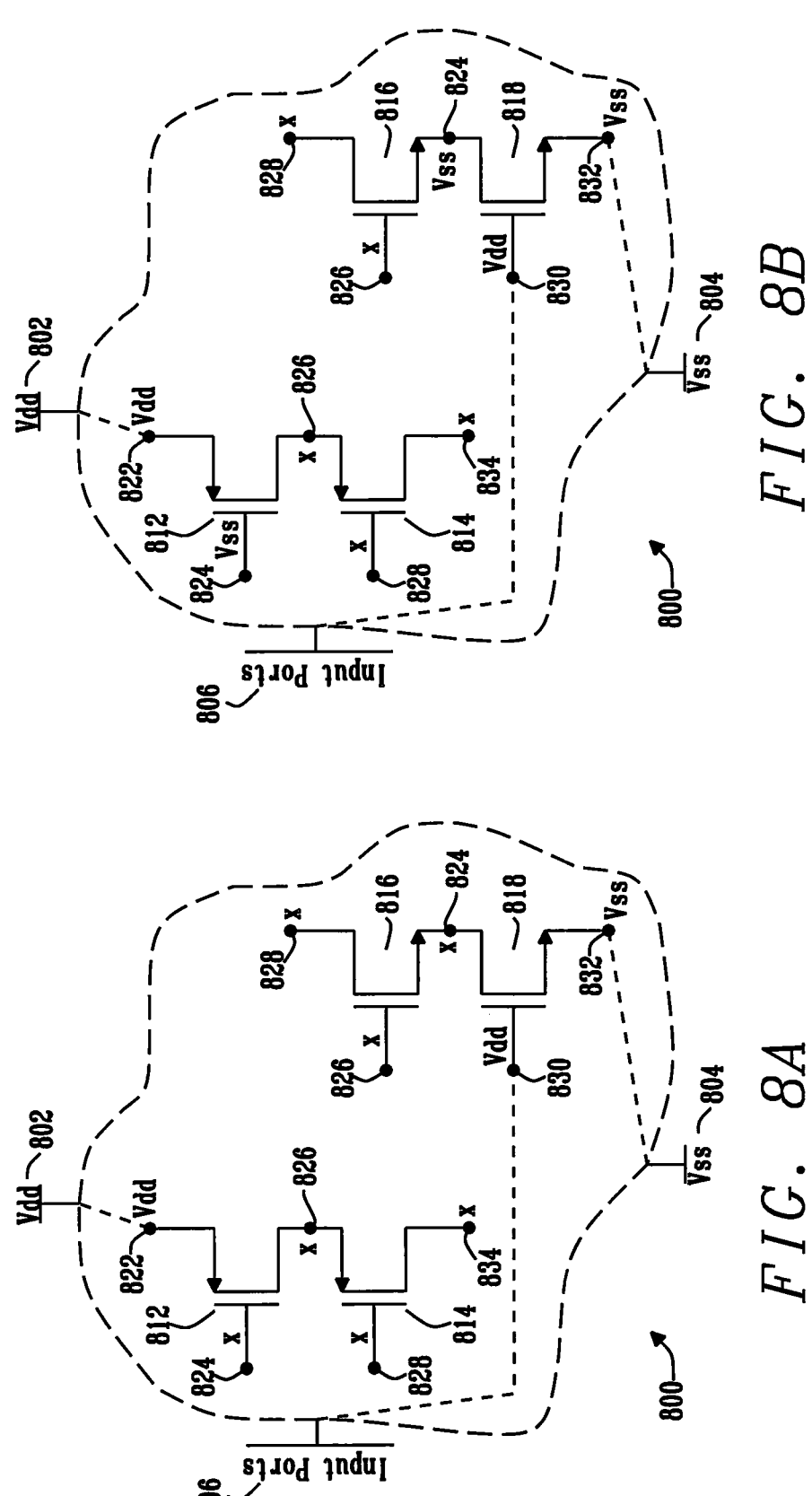
FIG. 8A illustrates the starting point of a propagation step of the method of FIG. 6 for a portion of a circuit.
FIG. 8B illustrates the portion of FIG. 8A after the first iteration of the propagation step.
Figures 8C, 8D:
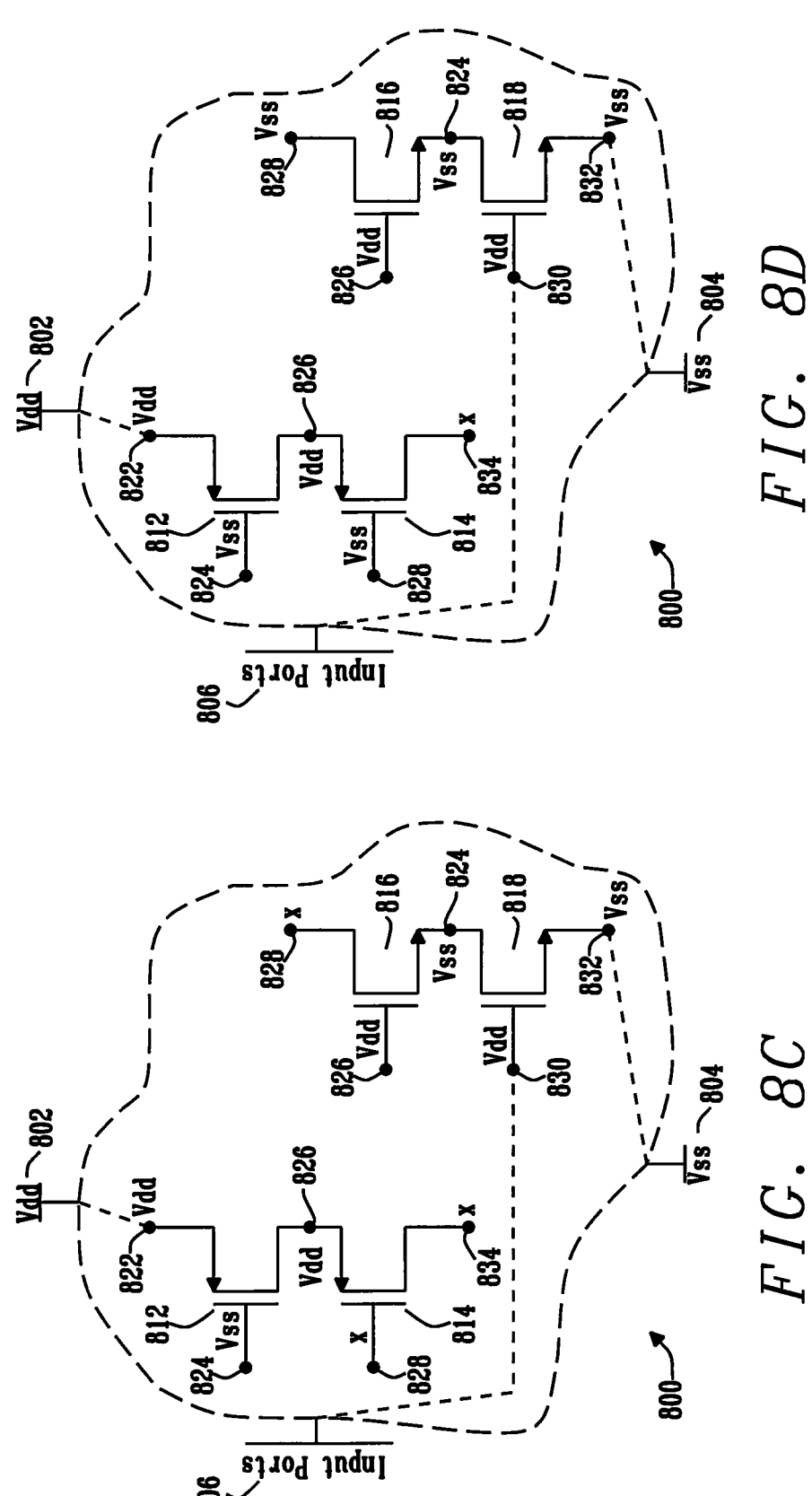
FIG. 8C illustrates the portion of FIG. 8A after the second iteration of the propagation step.
FIG. 8D illustrates the portion of FIG. 8A after the third iteration of the propagation step.

Each figure corresponds to a subsequent iteration of the voltage propagation step 609. FIG. 8a shows the voltages at the circuit nodes at a starting time of the voltage propagation step. FIGS. 8B, 8C and 8D show the voltages at the circuit nodes after the first, second and third iteration respectively.

The portion 800 comprises a high power supply 802, a low power supply 804, input ports 806, a first p-MOSFET switch 812, a second p-MOSFET switch 814, a first n-MOSFET switch 816 and a second n-MOSFET switch 818.

The example shown in the Figure illustrates a specific combination of input states in which only one of the input ports is coupled to the portion 810, said input port being set at voltage Vdd (high logic state).

The drain of the first p-MOSFET switch 812 is coupled to the source of the second p-MOSFET switch 814 at a node 826 and the source of the first n-MOSFET switch 816 is coupled to the drain of the second n-MOSFET switch 818 at a node 824. The gate of the first n-MOSFET switch 816 and of the first p-MOSFET switch 812 are coupled to nodes 826 and 824 respectively.

The source of the first p-MOSFET switch 812 is connected to a node 822 which is coupled to the high power supply 802 via circuitry not shown in the Figure and the source of the second n-MOSFET switch 818 is connected to a node 832 which is coupled to the low power supply port 804 via circuitry not shown in the figure. The gate of the second n-MOSFET switch 818 is connected to a node 830 which is coupled to one of the input ports 806, via circuitry not shown in the figure.

The gate of the second p-MOSFET switch 814 is connected to a node 828 which is also coupled to the drain of the first n-MOSFET switch 816.

At the start of the propagation step, only nodes 822, 830 and 832 have voltage assigned because they are directly connected to a power supply or input port with defined Vdd or Vss voltage. All other nodes are assigned a first test voltage 'x'.

At each iteration of the voltage propagation the circuit is swept to propagate a state (such as a voltage) from each node at known potential (Vdd or Vss) to all neighboring nodes. The state is propagated through the graph according to a set of predefined rules as configured by the inputs and the graph structure modified.

For example, the set of predefined rules may comprise rules as follows:

Rule 1: For n-MOSFET switches, if the gate terminal is coupled to Vdd and either the source or the drain terminal is at known potential Vdd or Vss and the other terminal (drain or source respectively) is at first test potential 'x', the voltage is propagated from the terminal at its known potential to the terminal at the first test potential. If the propagation step results in a short being created, report the short.

Rule 2: For p-MOSFET switches, if the gate terminal is coupled to Vss and either the source or the drain terminal is at known potential Vdd or Vss and the other terminal (drain or source respectively) is at first test potential 'x', the voltage is propagated from the terminal at known potential to the terminal at first test potential. If the propagation step results in a short being created, report the short.

Rule 3: For resistors below a predetermined threshold and for inductors, if one terminal is coupled to a node with assigned voltage Vdd or Vss and the other terminal is coupled to a node of first test voltage, the voltage is propagated from the terminal at known potential to the terminal at first test potential.

Rule 4: For resistors above a predetermined threshold and for capacitors, the voltage is not propagated between terminals, the component is treated as an open circuit and removed from the connectivity list. Alternatively, these components may not be added to the data structure in the first instance. For example, in some embodiments the method 600 may be configured to identify such components when the netlist is received and build the data structure accordingly by replacing said components with open circuits.

In accordance with the above rules, after the first iteration, the voltage Vss is propagated from node 832 to node 824 after the first iteration (FIG. 8B), the voltage Vdd is propagated from node 822 to node 826 after the second iteration (FIG. 8C), the voltage Vss is propagated from node 824 to node 828 after the third iteration (FIG. 8D), and so on.

At each iteration, the number of remaining nodes with the first test voltage 'x' in the circuit is counted and when the count stops decreasing, the propagation is terminated. At this point the supply voltages Vdd and Vss are statically propagated inside the circuit as far as possible.

It will be appreciated that additional rules may be followed for propagating the voltage through other types of components. It will also be appreciated that the rules are not intended to be executed in any specific temporal order and that at each iteration, the voltage may be propagated in parallel through many different components.

The propagation voltage step is likely to result in different patterns of node voltages for each different combination of input states. If after the voltage propagation step no more nodes with the first test voltage are present, then there are no floating nodes in the circuit. If there are still nodes with the first test voltage 'x' present, but the number stops decreasing and no more propagation is possible, such nodes are identified as floating nodes and may be added to the list of candidate problematic floating nodes which is built in step 612.

The candidate problematic floating nodes are selected from all floating nodes according to predefined rules. For each floating node, if the node is connected only to capacitors and/or to p-n junctions, such as the source and drain terminal of MOSFETs, and is not connected directly or indirectly to any gate or other control terminal of switches, the floating node is not added to the list of candidate problematic floating nodes. If the floating node is connected only to gate(s) of transistor(s) which have source and drain shorted together, such as for a capacitively connected transistor, and/or p-n junctions, the floating nodes is not added to the list of candidate problematic floating nodes. If the floating node is connected to the gate(s) of one or more transistors that have different or potentially different voltages at source and drain terminals, then the floating node is added to the list of candidate problematic floating nodes.

Note that the source and drain terminals are considered to have different voltages when one is at Vdd and the other is at Vss and they are considered to have potentially different voltage when either one or both are at first test voltage 'x'.

Figure 9:
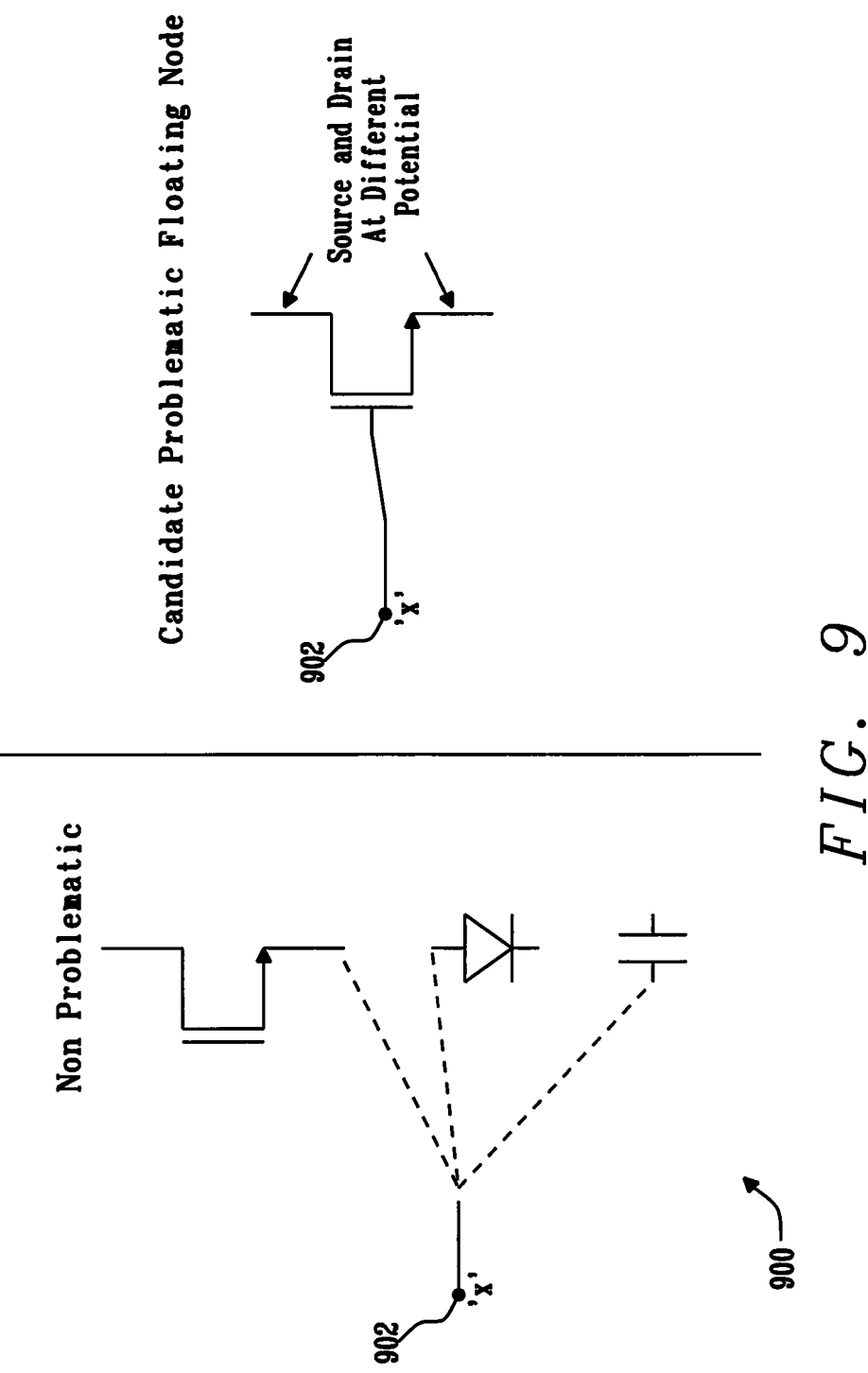
FIG. 9 is a simple schematic illustrating the criteria for the classification of a floating node as non-problematic or as a candidate problematic floating node.

FIG. 9 is a simple schematic illustrating the criteria for the classification of a floating node as non-problematic or as a candidate problematic floating node. If the nodes. A floating node 902 which is coupled directly or otherwise to the gate of a transistor with drain and source terminal at different potential is classified as a problematic floating node, otherwise it is classified as non-problematic.

In principle, candidate problematic floating nodes may be identified also by measuring the centrality of each floating node. The centrality may be determined by counting the number of neighboring transistor devices connected to a node.

Another method for measuring the centrality of a node is by calculating the so-called eigenvector centrality which is obtained from the eigenvalues of the adjacency matrix. However, both these methods do not take into account the nature and orientation of the connectivity and would lead to incorrect results. For example, for a diode or a diode-connected transistor with its cathode connected to Vdd and its anode connected to a transistor which is controlled by a floating node, would result in an incorrect classification as candidate problematic floating node. Another example which would result in an incorrect classification of a node as being a problematic candidate floating node is when a floating node is connected to the gate of a transistor which has source and drain at the same potential. Such centrality measures which are agnostic of the electrical connectivity and orientation of current flow in the circuit are therefore suboptimal relative to the solutions proposed in the present disclosure.

In the embodiment of FIG. 6, a floating node is assumed to be problematic if it causes leakage and in turn a node is assumed to cause leakage if a path to Vdd and a path to Vss may exist simultaneously from the terminals of any transistor connected to the floating node. Therefore, in order to identify such problematic nodes, the transistors with gates connected to a given node are turned on and the data structure is crawled from the terminals of the turned on transistors to search for said paths. Turning on the transistor is equivalent to stimulating the floating state of the node that may cause a crowbar leakage.

Figure 10:
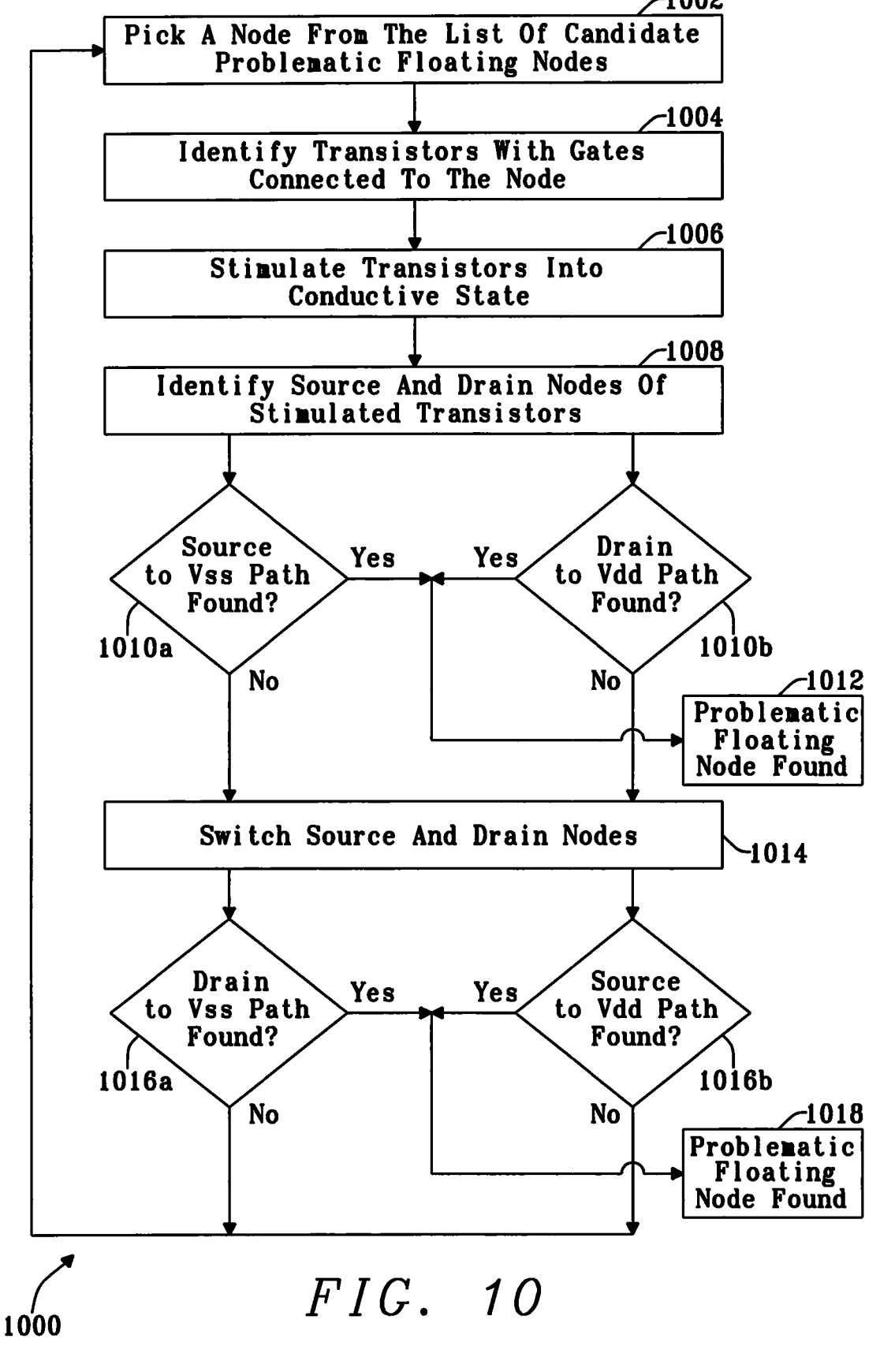
FIG. 10 is a flow chart of a method for stimulating a node or combination of nodes in a list of candidate floating nodes, using transistors as an illustrative use case.

FIG. 10 is a flow chart of a method 1000 for stimulating a node in the list of candidate problematic floating nodes. The method 1000 may be used as part of or in combination with the method 600.

At step 1002, a node is picked from the list of candidate floating nodes. At step 1004, all transistors with gate connected to the picked node are identified. At step 1006, the identified transistors are stimulated.

At step 1008, the source and drain of the stimulated transistors are identified. At step 1010*a* and 1010*b*, a path from the source to a Vss port and a path from the drain to a Vdd port are searched for each stimulated transistor. If both paths are found, the node is flagged as a problematic floating node (step 1012), i.e. a node causing leakage. Otherwise, the source and drain nodes are swapped (step 1014) and a path from the source to Vdd (step 1016*b*) and a path from the drain to Vss (step 1016*a*) are searched. If both these paths are found, the node is flagged as a problematic floating node (step 1018), otherwise a new node is picked from the list of candidate floating node and the method is repeated. At least one possible leakage path needs to found between Vdd and Vss for the node to be flagged as problematic.

FIG. 10 illustrates how the stimulation step 613 of FIG. 6 may be implemented for each node individually. Analogous steps can be implemented to stimulated combinations of nodes, as previously explained.

Searching for a path to Vdd or Vss from a drain or a source node may comprise crawling the data structure in successive crawling episodes or attempts via a crawling algorithm until a path is found. The crawling may comprise steps as follows:

1) For each node traversed from the starting node to which the source or drain terminal are connected to, a list of components connected to the node is extracted from the data structure.

2) If any of the extracted components are in a conductive state, either due to their gate begin connected to a power supply (e.g. Vdd for n-MOSFETs and Vss for p-MOSFETs) or due to another floating node being connected to their gate and being stimulated, the starting node is pushed into a queue of visited nodes and a child search for a path to Vdd or Vss is spawned from the node on the other side of the turned on component. If the child search is successful, the crawling algorithm backtracks the data structure and returns the instance ID of the of the turned-on component from which the child process was spawned.

3) Whenever a search reaches a Vdd or Vss node, the crawling attempt is considered successful and the crawling for the starting node is terminated.

In step 2) above, components may be classified as being in a conductive state according to a predefined set of rules. For example, all resistors below a certain threshold may be considered to be in a conductive state and treated like shorts. Therefore, when a resistor terminal is encountered during the crawling, a child search is started from the opposite terminal. Similarly, if the crawling process reaches the drain or source terminal of a turned-on transistor, a child search is started from the opposite source or drain terminal. For diode connected n-MOSFETs or p-MOSFETs and regular diodes, the directionality of traversal is taken into consideration. If the crawling algorithm is looking for a path to Vdd and the encountered diode terminal is the cathode, a child process is spawned from the opposite terminal, because the current flows from the anode to cathode if a path can be found. Otherwise, the diode is considered to be off and the search to Vdd is aborted for that path without returning any instance to the calling method. Similarly, if the crawling algorithm is looking for a path to Vdd and the encountered diode terminal is an anode, a child process is spawned from the opposite terminal, otherwise, the path is considered blocked and the process returns without further traversals.

Each time a component is encountered during the a crawling process and the node on the other side is at the first test voltage 'x', a new list of devices connected to said node 'x' is searched and a child process to search for Vdd or Vss is spawned from said node 'x'. Whenever the crawling algorithm traverses through a component to its other side, the list of visited nodes is updated with the component traversed so that the search does not backtrack through already traversed components and only moves forward.

The algorithm may also be configured to store in a list any traversed path that did not result in a successful crawling attempt, i.e. a Vdd or Vss node could not be reached, so that in subsequent crawling attempts, the list can be looked up and the same path is not searched, again unless the terminal conditions are changed (for example due to a different state of toggle inputs being examined).

For each node, as different paths to Vdd (or Vss) via the components connected to the node are crawled and child processes are spawned, the crawled paths may be stored in a list and, once all child processes are completed, only the shortest path is saved for said node, so that it can be re-used when said node is examined in future crawling attempts.

The floating node identification methods according to the present disclosure are process independent and do not rely on any compute heavy circuit analysis engines. It does not require any technology specific model data and does not require extensive setup.

The methods according to the present disclosure achieve a dramatic improvement of runtime compared to current state-of-the-art techniques. For a medium size circuit with a few thousand nodes, an improvement of at least 10× has been observed compared with methods which employ transient simulations of transistor behavior. The reduction in runtime is even larger for circuits with a great number of nodes, with speed improvements of up to 50×. When tested on a circuit with 3300 nodes, the proposed method was able to detect all floating nodes and floating nodes combination in about 12 hours, while it was estimated that state-of-the-art simulation tools would require at least 1 hour of runtime per input, resulting in a total runtime of several weeks.

Unlike prior art tools, the proposed method does not require running heavy simulations on expensive computer servers in order to identify floating nodes and therefore also allows to achieve considerable cost reduction.

Since the proposed method does a complete and thorough search through the circuit graph, it is theoretically impossible for a floating node to exist in a circuit after the method 600 has been applied. This is a significant improvement compared to current state-of-the-art simulation tools where on even moderately complex circuits, an exhaustive analysis is prohibitive due to cost and time, if not impossible. A test run on a 370-node IP block showed that the proposed method is able to detect floating nodes in less than a minute, whilst state-of-the-art simulation tools failed to detect the floating nodes. Therefore, the methods according to the disclosure can detect floating nodes which are missed by state-of-the-art tools and prevent such nodes ending up on chips and possibly requiring weeks of debugging and delays in production.

In some embodiments, the compute time may be further reduced by using machine learning. For example, the method 600 may comprise the optional step 619 in which training data comprising connectivity and path data are collected and provided to a machine learning model to predict the probability that a given node may provide a leakage path. The machine learning model may comprise for example a neural network. The result from the prediction is then used in the next iterations to prioritize nodes with the higher probability. In most cases this will reduce the time taken to identify a path to Vdd or Vss and therefore to check whether a node under analysis can provide a leakage path and should be classified as harmful.

If a prediction turns out to be wrong, i.e. if a node which has been classified by the neural network has having a high probability of being connected by a path to Vdd or Vss turns out not to have such path, then the machine learning model is updated accordingly and an exhaustive search of all the nodes connected to the node under analysis is conducted in order to check whether the node provides a direct path between Vdd and Vss.

It will be appreciated that various machine learning models may be used to achieve the above improvements. Two examples are presented below with reference to FIG. 11 and FIG. 12A through 12D.

FIG. 11 is a schematic diagram of a first machine learning method 1100 for use in combination with the floating node detection methods of the present disclosure.

The method 1100 uses supervised machine learning to predict which nodes are more likely to have a path to a Vdd or Vss port and what the expected path length to Vdd or Vss is. The predicted information mays be used for example to prioritize such nodes during a crawling step of the methods according to the present disclosure.

For a given node N, the number of paths to be searched in order to find a path to Vdd or Vss depends on the number and type of components (such as transistor, diodes, resistors etc.) which are connected to N. Quite often, it is possible to identify patterns in the type and number of components connected to a node. For example, more PMOS transistors may be found near a Vdd node and more NMOS transistors may be found near a Vss node.

At step 1102, connectivity data are collected for each node in the data structure to learn the pattern of device population near a Vdd or a Vss node. The data may be collected for example during the crawling step 615 of method 600. The collected data may comprise for each node traversed during the crawling: the number and type of components connected to said node, whether an attempt to reach either Vdd or Vss from said node is successful and, for successful attempts the number of edges traversed between said node and either Vdd or Vss.

At step 1104 a neural network is selected. For example, the neural network may be a neural network comprising 1-2 hidden layers.

At step 1106, as various crawling attempts are performed and various nodes are traversed in each attempt, the data for each node are continuously fed into the neural network model to train a binary classifier and regressor. The different number and types of components connected to each node may be used as input data. A binary variable representing the success or failure of crawling attempts from each nodes and, for successful attempts only, the number of edges traversed from the node to reach Vdd or Vss may be used as target outputs.

At step 1110, the model performance may be evaluated by testing the model predictions on a validation set.

At step 1112, the trained model may be used on the connectivity representation of a new circuit to be tested, provided at step 1108. For each node, the model is used to predict the probability of success to reach a Vdd port or a Vss port from said node and an expected path length based only on the connectivity information associated with it, such as the number and type of components connected to it.

At step 1114, based on the information predicted at step 1112, a shortlist of nodes and shortest paths are identified and searched first when crawling the data structure for a path to Vdd or Vss, thereby saving compute time.

It will be appreciated that various other implementations of the method 1110 may be possible without departing from the teachings of the present disclosure. For example, the number and choice of inputs, the number and choice of target output, the layers in the neural network may all vary from one embodiment to the other. It will also be appreciated that other machine learning methods which do not employ neural networks may be used in order to achieve the same predictions.

In some embodiments, the search of a path to Vdd or Vss is expedited by using a machine learning algorithm based on reinforcement learning.

In some embodiments, a reinforcement learning algorithm assigns to each node of the connectivity representation a score which reflects its worthiness (or probability/likelihood) of being in a leakage path. As the graph is crawled from the terminals of a stimulated transistor to search for a path to Vdd or Vss, each node which is traversed during the crawling has its score updated based on its distance from Vdd or Vss.

As large number of nodes are traversed in successive crawling attempt, the value of each node that participated in already traversed paths begin to reflect its proximity and reachability to a Vdd or a Vss port.

Once sufficient number of nodes have been assigned scores, searching a path to Vdd or Vss from a transistor's terminals is reduced to tracing through its neighbors the path with the nodes that have the highest value score and crawl the graph in the direction of increasing node scores. This increases the chance to find a path to Vdd or Vss in the first few crawling attempts.

A specific example is discussed with reference to FIG. 12A through 12D.

Figures 12A, 12B, 12C, 12D:
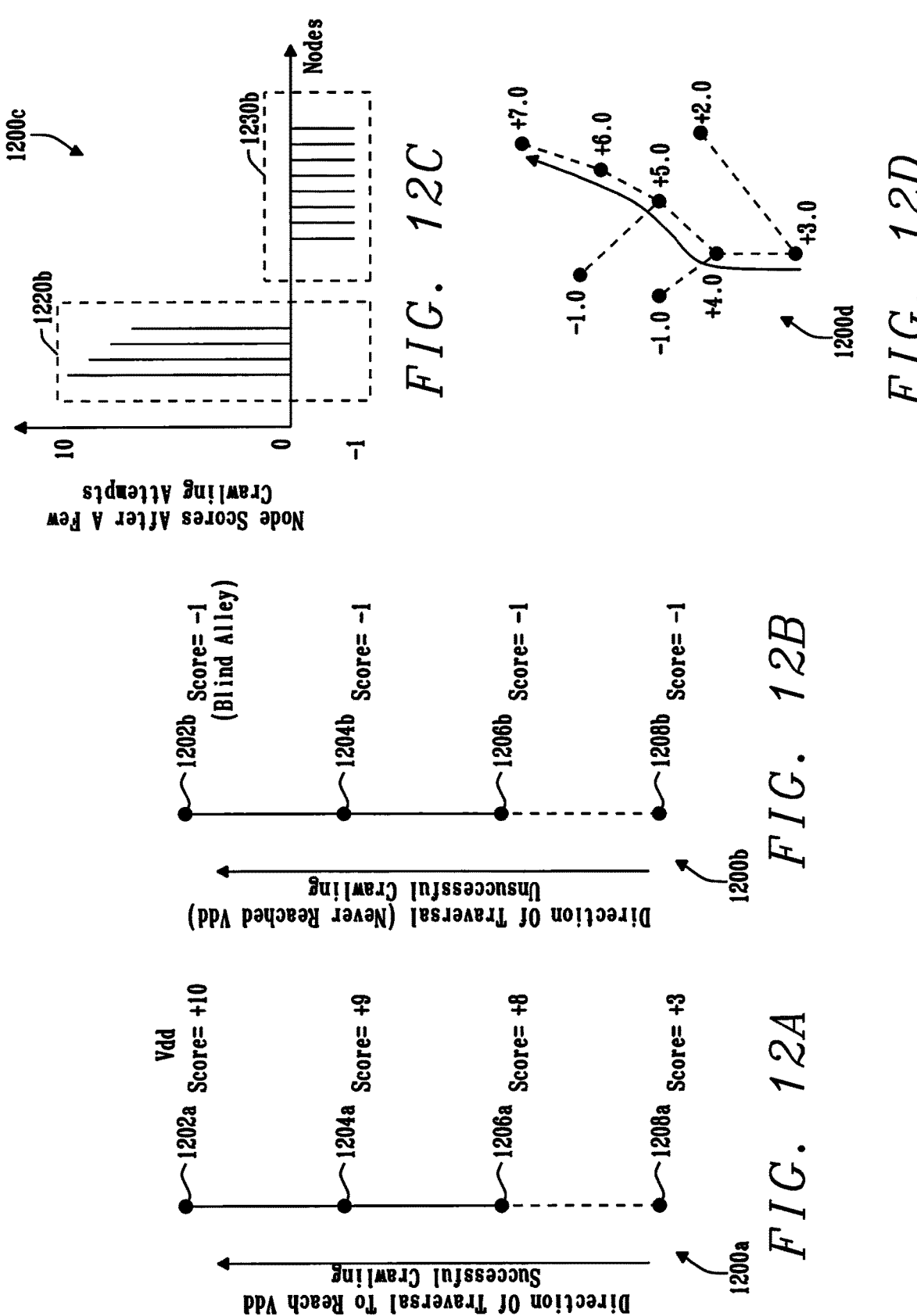
FIG. 12A shows an example of successful crawling attempt to find a path to Vdd from a starting node.
FIG. 12B shows an example of an unsuccessful crawling attempt to find a path to Vdd from a starting node.
FIG. 12C is an example plot of node scores after a few successful and unsuccessful crawling events.
FIG. 12D is an example of a crawling attempt which uses the scores of a reinforcement learning algorithm to find a path to Vdd.

FIG. 12A shows an example of successful crawling attempt to find a path to Vdd from a starting node 1208a.

The data structure 1200a comprises four nodes 1202a, 1204a, 1206a and 1208a. Node 1202a is connected to 1204a which in turn is connected to 1206a.

Node 1208a, which is the starting node, is coupled to node 1206a via one or more intermediate nodes or edges (not shown in the figure).

All nodes which have voltage Vdd, in this example only node 1202a, are assigned a high score, such as 10. It will be appreciated that the choice of 10 is arbitrary and simply means that the machine learning algorithm gets a reward of 10 if a crawling attempt reaches a node with voltage Vdd.

The data structure 1200 is crawled from the starting node 1208a to find a path to Vdd. In general, node 1208a will be a node coupled to a terminal of a stimulated transistor. The crawling attempt passes through some intermediate nodes, then reaches node 1206, node 1204 and node 1202. Since the nodes 1204 and 1206 were traversed in a successful crawling attempt, they are assigned a score of 9 and 8 respectively. Similarly, the intermediate nodes traversed between node 1208a and 1206a are traced backward and assigned decreasing score up until node 1208a. In the example shown in FIG. 12A the intermediate nodes traversed during the crawling comprise 4 nodes and therefore the final score of node 1208a turns out to be 3.

FIG. 12B shows an example of an unsuccessful crawling attempt to find a path to Vdd from a starting node 1208*b*.

The data structure 1200*b* comprises four nodes 1202*b*, 1204*b*, 1206*b* and 1208*b*. Node 1202*b* is connected to 1204*b* which in turn is connected to 1206*b*. Node 1208*b*, which is the starting node, is coupled to node 1806*b* via one or more intermediate nodes or edges (not shown in the figure).

The data structure 1200*b* is crawled from the starting node 1208*b* to find a path to Vdd. The crawling attempt passes through some intermediate nodes, then reaches nodes 1206*b* and 1204*b* and ends in node 1202*b*. The crawling attempt is unsuccessful since node 1202*b* does not have voltage Vdd, therefore node 1202*b* and all the nodes traversed during the crawling attempt which do not have a score assigned, are assigned a different score, such as −1 (noting that this specific value is arbitrary and that any suitable reward scheme may be used). Nodes traversed during the attempt which have a score assigned, e.g. because they were previously traversed in a successful crawling attempt, maintain the highest score.

In practice, after a few crawling attempts, many nodes in a data structure will either have received a positive value score (increasing as their distance from Vdd decreases) or a negative value score, which means they have only been traversed in crawling attempts which led to a dead end.

FIG. 12C is an example plot of node scores after a few successful and unsuccessful crawling events. The plot 1200*c* shows for each node in the data structure what score is assigned to them. In this specific example the nodes 1220*b* have positive scores because they have been traversed in successful crawling attempts which led to Vdd and the nodes 1230*b* have negative score equal to −1 because they have only been traversed in unsuccessful crawling attempts.

As more crawling attempts are performed, the scores of the nodes are updated to reflect new successful attempts. Subsequent searches of a path to Vdd can find a path in less attempts by simply looking at the scores of the nodes. Higher scores mean a shorter path to Vdd and negative scores mean the corresponding nodes do not lead to Vdd.

FIG. 12D is an example of a crawling attempt which uses the scores of the reinforcement learning algorithm to find a path to Vdd.

The data structure 1200*d* is crawled randomly from a starting node (not shown) until a node 1204 with assigned positive score is reached. Once that node is hit, the rest of the path to Vdd does not need to be computed via crawling the data structure since it simply enough to follow the nodes with increasing scores to reach Vdd.

The above machine learning methods allow to reduce the compute time to find a path to Vdd or Vss dramatically after just a few crawling episodes. Similar steps can be implemented in order to assign and update scores with respect to Vss. It will be appreciated that variants of the above method are possible. For example, different scoring systems may be used; in some embodiments, the learning algorithm may use a combined score for Vdd and Vss rather than two separate scores, and so on.

The reduction in runtime achieved by the methods of the present disclosure is dramatic especially when the same or a similar circuit design needs to be tested again. It is very convenient to perform quick analysis of potential circuit fixes. If a floating node is identified and rectified, the proposed method allows to test the new circuit without having to provide a completely new netlist. The information learned by the algorithm will allow to reduce the number of attempts required to link each node to either power supply and therefore reduce drastically the time required to ascertain that the circuit fix works.

Figure 13:
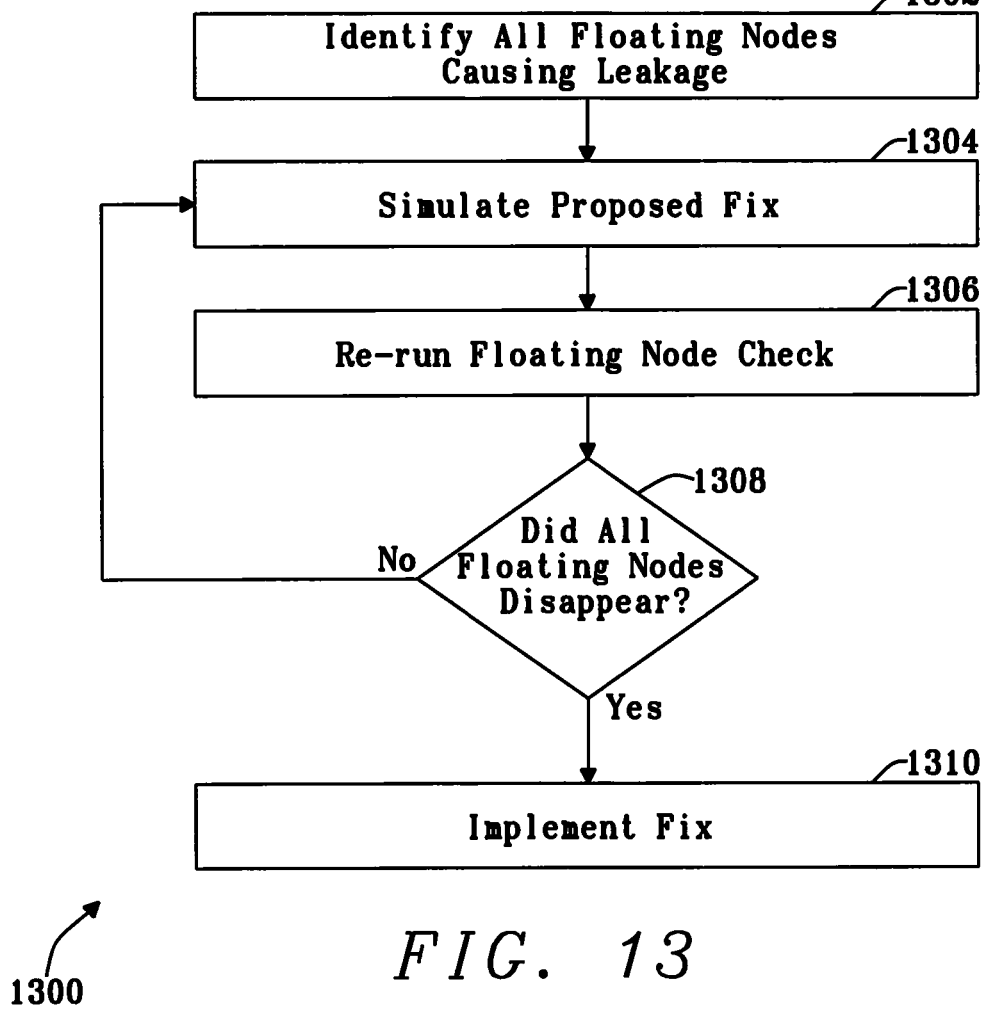
FIG. 13 is a diagram illustrating a method for verifying and implementing a proposed circuit fix.

A circuit fix may consist for example in tying an identified floating node causing leakage to the high power supply Vdd or to the low power supply Vss. FIG. 13 is a diagram illustrating a method 1300 for verifying and implementing a proposed circuit fix.

The method 1300 comprises the steps of: identifying all floating nodes causing leakage in a circuit according to the methods of the present disclosure (step 1302); applying the proposed fix, which may be for example tying a specific node from the list of step 1302 to Vdd or Vss (step 1304); repeating the method of step 1302 to identify all floating nodes causing leakage in the circuit (step 1306); if all floating nodes causing leakage have disappeared (step 1308), implementing the fix (step 1310), otherwise returning to step 1304.

The step of implementing the fix may consist for example of updating a netlist or a graph of the circuit which is provided in input to step 1302.

It will be appreciated that the method 1300 may be partly or fully automated. For example, the method 1300 may be implemented by an algorithm to which a circuit designer only has to provide a circuit netlist at step 1302 and a proposed circuit fix at step 1304. The step of providing a circuit fix may also be automated. For example, an algorithm may be used to loop through all the nodes identified at step 1302 and attempt to tie each node to either Vdd or Vss power supply until no floating nodes causing leakage are present anymore. If no solution is found, then all possible combinations of the nodes identified at step 1302 may be tested in turn by tying one or more nodes in each combination to Vdd and/or Vss. The algorithm may implement machine learning methods to learn certain characteristics and which fixes are most likely to be successful so that the most likely fixes are tested first in future runs.

FIG. 14 shows a test 1400 in which the methods of the present disclosure are applied. The test 1400 was run on an analogue circuit block with one digital input ('nolgainTrm') which can be toggled between 1'b0 and 1'b1 by a One-Time Programmable Memory (OTP). The block was known to have a harmful floating node combination when the input is set to 1'b0.

The test 1400 shows that the methods of the present disclosure allow to successfully detect the harmful floating node combination when the input is set to 1'b0 (step 1402) and that no harmful floating node combination is detected when the input is set to 1'b1 (step 1404). The whole test only takes less than a second, showing a drastic improvement over prior art methods.

FIG. 15 shows another test 1500 in which the methods of the present disclosure are applied. The test 1500 was run on a dual comparator circuit comprising an upper comparator and a lower comparator each having an enable input which could be toggled between 1'b0 and 1'*b*1 to disable and enable the comparators respectively. The dual comparator circuit was known to have a harmful floating node for the input combination wherein the upper comparator was enabled and the lower comparator was disabled.

The test 1500 shows that the methods of the present disclosure allowed to successfully identify the harmful floating node 'I30_comp2' (step 1502). The identified floating node 'I30_comp2 was then tied to Vdd as a proposed fix (step 1504) and when the circuit was tested again no floating nodes were detected.

It will be appreciated that in different embodiments the steps of the above methods may be executed in different order and that the stated steps do not preclude the presence or addition of one or more other steps.

Figure 16:
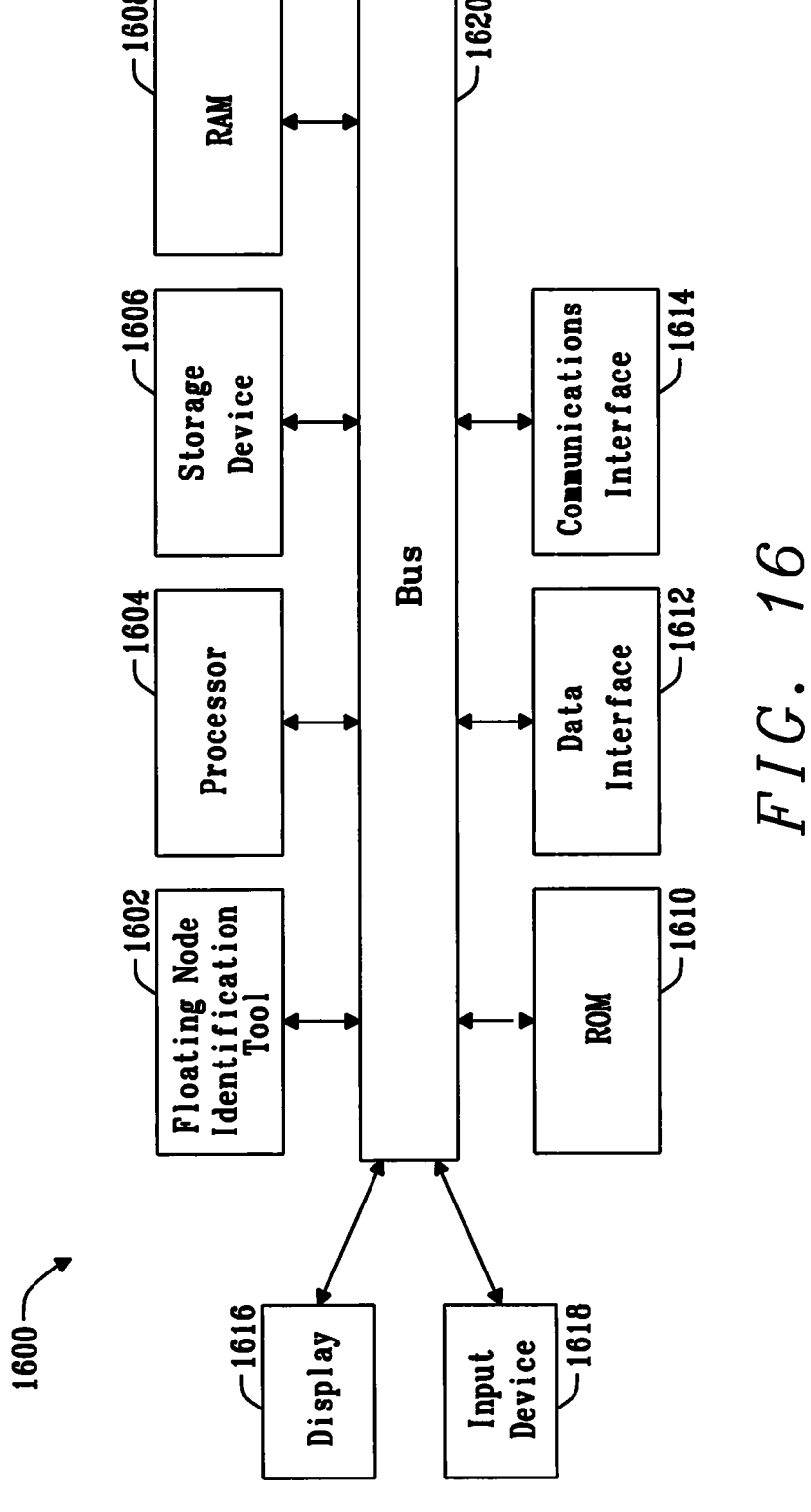
FIG. 16 is a schematic diagram of an electronic data processing system which comprises specially modified components for carrying out the methods of this disclosure, in accordance with a second aspect of the present disclosure.

FIG. 16 is a schematic diagram of an electronic data processing system 1600 which comprises specially modified components for carrying out the methods of this disclosure, in accordance with a second aspect of the present disclosure.

The electronic data processing system 1600 comprises a module 1602 which is configured as a floating node identification tool configured to implement the methods of the present disclosure.

The electronic data processing system 1600 may comprise a processor 1604, a storage device 1606, RAM 1608, ROM 1610, a data interface 1612, a communications interface 1614, a display 1616, and an input device 1618. The electronic data processing system 1600 may comprise a bus 1620 to enable communication between the different components.

The electronic data processing system 1600 may be configured to load an application. The instructions provided by the application may be carried out by the processor 1604. The application may be the automated harmful floating node identification tool.

A user may interact with the electronic data processing system 1600 using the display 1616 and the input device 1618 to instruct the electronic data processing system 1600 to implement the methods of the present disclosure in the testing of a circuit.

In conclusion, the methods and systems of the present disclosure allow to identify floating nodes in a circuit which may cause leakage or other unexpected behavior with the same or a better accuracy than prior art methods, whilst reducing runtime and costs.

Various improvements and modifications may be made to the above without departing from the scope of the disclosure.

For example, the disclosure can be used to track the propagation of any state through an appropriate data structure. The propagation of voltages is just one example of this; the principles of the disclosure can be applied generally to track the state of a system and can include propagation of states representing other parameters such as light, for connected optical components.

What is claimed is:

1. A method in an electronic data processing system, a method of optimizing an input circuit design by creating a data structure for transforming the input circuit design, the data structure representing the input circuit design comprising a plurality of nodes connected via edges; and interrogating the data structure to find floating nodes, where each node represents a node of the circuit, each edge represents a circuit component, and wherein the data structure can be traversed across all connected nodes;

wherein the plurality of nodes comprises a thousand or more nodes;

wherein interrogating the data structure further comprises identifying candidate problematic floating nodes and stimulating each of the identified candidate problematic floating nodes; where said candidate problematic floating nodes are identified as confirmed problematic floating nodes if, when stimulated, a path exists between a high node and a low node as a result of the stimulation and wherein, in response to identifying said candidate problematic floating node to be said confirmed problematic node, apply a proposed fix to rectify the problematic node, and wherein applying the proposed fix comprises tying the problematic node to a first supply connected node or to a second supply connected node;

wherein interrogated paths of the data structure are stored in a memory and then have their results referenced in future events instead of the paths being repeated;

wherein identifying candidate problematic floating nodes comprises selecting which nodes supply a control signal for a switch device which is selectively operable to control conductivity of a channel;

wherein each switch device comprises a first terminal and a second terminal, and for each switch device, the method comprises:

tracing a path from the first terminal to the first supply connected node and from the second terminal to the second supply connected node and then identifying a node as a problematic node causing leakage if both paths are found;

otherwise, if both paths are not found, tracing a path from a first terminal to the second supply connected node and from a second terminal to the first supply connected node and then if both paths are found, identifying the node as a problematic node causing leakage; and otherwise ignoring/discarding the node from the list of candidate problematic floating nodes.

2. The method of claim 1, wherein the data structure comprises a graph and traversing the data structure comprises crawling the graph.

3. The method of claim 1, further comprising receiving an input circuit design, and transforming the circuit design to said data structure.

4. The method of claim 3, wherein said input circuit design comprises a netlist or other circuit structure description.

5. The method of claim 1, wherein the input further comprises a list of supply connected nodes.

6. The method of claim 1, wherein the data structure comprises a node connectivity representation which comprises any one of: an adjacency matrix, adjacency list, and an edge list.

7. The method of claim 3, wherein the data structure comprises an associative array with unique node names as keys and the value for each key is a connectivity list of component terminals connected to it.

8. The method of claim 4, wherein transforming the circuit design comprises flattening the netlist to a set of primitive circuit components.

9. The method of claim 5, wherein the supply connected nodes comprise at least one high power supply port and at least one low power supply port.

10. The method of claim 1, wherein the input further comprises a list of one or more input ports, wherein each of the input ports can be toggled between two or more input states.

11. The method of claim 10, comprising updating the data structure for different combinations of input states.

12. The method of claim 1, wherein the step of interrogating the data structure to find floating nodes comprises: finding nodes which are not coupled with any supply connected node, and identifying those nodes as said floating nodes.

13. The method of claim 12, wherein identifying nodes which are not connected to any supply connected node comprises:

assigning a first test voltage to each node;

iteratively propagating a port voltage inside the data structure; and identifying those nodes which remain at the first test voltage after the propagation as nodes not coupled with any supply connected node.

14. The method of claim 9, wherein stimulating each of the identified candidate problematic floating nodes to check if the stimulated node provides a leakage path comprises finding a shortest path in the data structure from the nodes to the supply connected nodes.

15. The method of claim 11, wherein the switch device comprises a transistor.

16. The method of claim 2, wherein, during a data structure traversal, when a diode is encountered, a node adjacent to a first diode electrode is checked to see if it is also coupled with a second diode electrode taking into consideration the expected direction of current flow, were it to be included in a possible leakage path: then, if it is connected, the path search continues; and if it is not connected, the path search aborts.

17. The method of claim 12, wherein interrogating the data structure further comprises identifying combinations of candidate problematic floating nodes, and stimulating each of the identified combinations to check if any of the nodes in the stimulated combination provides a leakage path; where the nodes in the stimulated combination are identified as confirmed problematic floating nodes if a leakage path exists as a result of the stimulation.

18. The method of claim 9, wherein the candidate problematic floating nodes identified as confirmed problematic floating nodes are excluded from a list of candidate floating nodes; and thereafter the method comprises:

identifying combinations of the remaining candidate problematic floating nodes, and stimulating each of the identified combinations to check if any of the nodes in the stimulated combination provides a leakage path;

where the nodes in the stimulated combination are identified as confirmed problematic floating nodes if a leakage path exists as a result of the stimulation.

19. The method of claim 18, comprising iteratively identifying confirmed problematic floating nodes based on successive new combinations.

20. The method of claim 19, wherein a combination of the remaining candidate problematic floating nodes is selected based on its adjacency to a previously identified node or combination of nodes.

21. The method of claim 1, wherein the interrogation paths of the node connectivity representation which are stored in memory comprise a list of paths searched which did not lead from a node to a supply connected node.

22. The method of claim 1, wherein connectivity statistics for each node are collected as training data and fed into a machine learning model to predict the leakage causing probability of each node.

23. The method of claim 22, wherein a result from the prediction is used to prioritize nodes during next interrogation to reduce the time taken to identify a path to a voltage port.

24. The method of claim 1, wherein a neural network model is trained with number and type of components as inputs and is used to predict path length and probability of success to reach a supply connected node from a given node based on the connectivity information associated with it.

25. The method of claim 21, wherein, based on the predictions of the model, a shortlist of nodes and possible paths are identified and searched first for the shortest path to one or more of the supply connected nodes.

26. The method of claim 1, wherein, as the data structure is initially traversed in search of a supply connected node, each node is updated with a value score that reflects its worthiness of being in a leakage path.

27. The method of claim 26, wherein interrogation of the data structure comprises following a path of nodes that have successively increasing value scores.

* * * * *